United States Patent [19]
Miyazawa

[11] Patent Number: 5,984,081
[45] Date of Patent: Nov. 16, 1999

[54] CONTINUOUS UNLOADER

[75] Inventor: Isao Miyazawa, Urawa, Japan

[73] Assignee: Ishikawajima-Harimi Heavy Industries Co., Ltd., Tokyo, Japan

[21] Appl. No.: 08/952,720

[22] PCT Filed: Mar. 28, 1997

[86] PCT No.: PCT/JP97/01083

§ 371 Date: Nov. 20, 1997

§ 102(e) Date: Nov. 20, 1997

[87] PCT Pub. No.: WO97/36809

PCT Pub. Date: Oct. 9, 1997

[30] Foreign Application Priority Data

| Mar. 29, 1996 | [JP] | Japan | 8-77086 |
| Mar. 29, 1996 | [JP] | Japan | 8-77087 |
| Mar. 29, 1996 | [JP] | Japan | 8-77088 |
| Mar. 29, 1996 | [JP] | Japan | 8-77089 |
| Mar. 14, 1997 | [JP] | Japan | 9-60744 |

[51] Int. Cl.[6] .......... B65G 17/36; B65G 67/60
[52] U.S. Cl. ........ 198/509; 198/307.1; 198/520; 198/588; 198/594; 198/703; 414/141.1; 414/142.5
[58] Field of Search .......... 414/141.1, 142.5; 198/509, 307.1, 588, 594, 700, 703, 520

[56] References Cited

U.S. PATENT DOCUMENTS 708,634  9/1902  Gregg ..................... 198/520

FOREIGN PATENT DOCUMENTS

| 58-69635 | 4/1983 | Japan | B65G 67/60 |
| 63-267607 | 11/1988 | Japan | B65G 21/22 |
| 5-5741 | 1/1993 | Japan | B65G 67/60 |
| 8-26489 | 1/1996 | Japan | B65G 67/60 |

*Primary Examiner*—William E. Terrell
*Assistant Examiner*—Mark Deuble
*Attorney, Agent, or Firm*—McCormick, Paulding & Huber LLP

[57] ABSTRACT

A continuous unloader includes upper sprockets, lower sprockets located below the upper sprockets, and front sprockets located in front of the lower sprockets. An endless bucket conveyer is operatively taken on the upper, lower and front sprockets. A support frame supports the upper sprockets. An elevation/lowering mechanism is provided at a lower end of the support frame. A base part is operatively connected to the lower end of the support frame by way of the elevation/lowering mechanism such that the base part is raised and lowered by the elevation/lowering mechanism relative to the support frame. A link mechanism is connected to the front and lower sprockets such that the front and lower sprockets are lowered when the distance between the front and lower sprockets is narrowed and the front and lower sprockets are raised when the distance between the front and lower sprockets is widened. The link mechanism is also connected to the base part so that it is raised and lowered together with the base part upon actuation of the elevation/lowering mechanism.

14 Claims, 26 Drawing Sheets

CONTINUOUS UNLOADER

TECHNICAL FIELD

The present invention relates to a continuous unloader that is capable of continuously digging up balk cargoes such as coal or iron ore from a ship hold and the like for unloading.

BACKGROUND ART

As shown in FIG. 27, a continuous unloader generally includes upper sprockets a, lower sprockets b that are located below the upper sprockets a, front sprockets c that are located in front of the lower sprockets b, and an endless bucket conveyer d that is circularly engaged with the sprockets a, b, c. Bulk cargo f (such as coal, iron ore) in a ship hold e is dug up by the bucket conveyer d between the front sprockets c and the lower sprockets b and the dug cargo is lifted up by the bucket conveyer d between the lower sprockets b and the upper sprockets a. The buckets are then turned over by reverse sprockets g such that the cargo in the buckets is dropped on a table feeder (not shown) provided in a top support frame h. The dropped cargo is carried by a conveyer (not shown) and a chute j that are provided in a beam i and is unloaded onto a quay k.

As the opening width of a hatch m of the ship hold e is generally narrower than the inner width of the ship hold e, it is convenient if the front sprockets c and the lower sprockets b can be arranged such that the distance between them is narrowed when they pass through the hatch m and then the distance is widened when they dig up the cargo in the ship hold e. An example of such a continuous unloader that is capable of adjusting the distance between the front sprockets c and the lower sprockets b is shown in FIG. 28.

In the continuous unloader shown in FIG. 28, the front sprockets c are mounted at one end of a telescopically extensible/retractable frame q and the lower sprockets b are mounted at the other end of the extensible frame q such that the distance between the both sprockets c, b can be changed by an extensible/retractable cylinder r. The extensible (/retractable) frame q includes an inner cylinder o and an outer cylinder p. A guide rod t that is connected with the outer cylinder p by way of a connection member s is engaged with a guide channel u that is provided at the lower end of a frame (an elevator casing) n for supporting the upper sprockets a such that the guide rod t can be vertically moved along the guide channel u by a up-down cylinder v. The distance between the outer cylinder p and the upper sprockets a can be changed by extending/retracting the up-down cylinder v.

According to the arrangement described above, the distance between the front sprockets c and the lower sprockets b can be narrowed without generating too much slack in chains w of the bracket conveyer d by retracting the extensible/retractable cylinder r and extending the up-down cylinder v. Conversely, the distance between the front sprockets c and the lower sprockets b can be widened without generating too much tense in the chains w of the bracket conveyer d by extending the extensible/retractable cylinder r and retracting the up-down cylinder v.

However, the conventional continuous unloader described above has following shortcomings.

First, as two cylinders (the extensible/retractable cylinder r and the up-down cylinder v) are needed for adjusting the distance between the front sprockets c and the lower sprockets b, the structure of the whole system becomes complicated. In addition, as extension/retraction of the extensible/retractable cylinder r and the retraction/extension of the up-down cylinder v must be synchronized such that no excessive slack or tense be generated in the chains w of the bucket conveyer d during the extension/retraction or up/down motion of the extensible frame q, a complicated hydraulic control is required.

Further, as the extensible/retractable cylinder r must have a relatively long and large special cylinder that has the same length of stroke as the extension/retraction stroke of the extensible frame q, the extensible/retractable cylinder r inevitably has a large size and volume, increasing its production cost. Further, since the up-down cylinder v is arranged such that it lifts up the extensible frame q with the extensible/retractable cylinder r, the up-down cylinder v is required to have a lift-up force sufficient for lifting up the extensible/retractable cylinder r as well. This results in the larger size of the up-down cylinder v and the whole system.

The present invention is contrived in order to solve the problems described above. Its object is to propose a continuous unloader that has a simple structure and a relatively small weight in which no complicated control is required and the production cost is relatively low.

SUMMARY

In the present invention, in order to achieve the aforementioned object, a continuous unloader that has upper sprockets, lower sprockets below the upper sprockets, front sprockets in front of the lower sprockets and an endless bucket conveyer taken on these sprockets is characterized in that the lower sprockets and the front sprockets are connected to the lower end of a support frame that supports the upper sprockets by way of a link mechanism that makes the lower and front sprockets be lowered/raised when the distance between the two sprockets are narrowed/widened. According to the present invention, as the adjustment of the distance between the lower and the front sprockets and the adjustment of up/down motion of these sprockets are both carried out by a common link mechanism, the whole system can have relatively simple structure and small weight. Therefore, no complicated control is required and the production cost is not so expensive.

The front sprockets may be provided at one end of an extensible/retractable frame and the lower sprockets maybe provided at the other end of the extensible frame. The extensible frame may be extensibly/retractably suspended by the link mechanism. With this, the distance adjustment between the front and the lower sprockets can be performed being guided by the extension/retraction of the extensible/retractable frame.

The link mechanism may include: a main link of which one end is connected to the lower end of the support frame and of which the other end is connected to the front sprockets side; an assistant link of which one end is connected to the midpoint of the main link and of which the other end is connected to the lower sprockets side; and a stay link of which one end is connected to the midpoint of the assistant link and of which the other end is connected to the lower end of the support frame. With this link mechanism, the distance adjustment between the lower and the front sprockets as well as the up/down motion adjustment of these sprockets can be achieved.

An actuator may be connected to the link mechanism such that the link mechanism can change its shape and level and retain that changed position. By operating the actuator, the distance between the lower sprockets and the front sprockets as well as the vertical position of these sprockets can be adjusted and retained at the adjusted position.

The actuator may include a cylinder, and one end of the cylinder may be connected to the lower end of the support frame to which the link mechanism is connected and the other end may be connected to one of the links that are the components of the link mechanism. By extending/retracting this cylinder, the link mechanism is operated such that the distance adjustment and the up/down motion of the front and the lower sprockets be carried out.

A cylinder for extending/retracting the whole length of the stay link may be installed in each stay link. By extending/retracting this cylinder, the line linking the lower and the front sprockets can be tilted against the horizontal line such that the bucket conveyer between the lower and the front sprockets can flexibly follow the tilting movement of the ship hold floor.

The actuator may be provided with control means for controlling a holding force of the link mechanism by the actuator. Then, by weakening the holding force of the link mechanism by the actuator with this control means, the touching pressure of the bucket conveyer between the lower and the front sprockets against the ship hold floor during the "cleaning-up" operation can be made small such that the bucket conveyer flexibly follows the swinging movement of the ship hold floor due to waves and the like.

The actuator may include a cylinder that is provided between the link mechanism and the lower end of the support frame the link mechanism is connected thereto, and the control means may include a hydraulic circuit for controlling hydraulic pressure that is supplied to the cylinder.

The hydraulic circuit may include an accumulator for, by supplying pressure of a predetermined level to the cylinder, holding the weight of the link mechanism, the front and the lower sprockets, and a portion of the bucket conveyer that is taken on between the front and the lower sprockets.

The holding force by the accumulator may be set such that it is slightly smaller than the weight of the link mechanism, the front and the lower sprockets and a portion of bucket conveyer that is taken on between the front and the lower sprockets.

A front frame may be provided at the front sprockets for guiding the travel of the bucket conveyer between the front sprockets and the lower sprockets, and a parallel link mechanism may be provided between the front frame and the lower end of the support frame such that the front frame is elevated/lowered by the parallel mechanism without tilting from its horizontal position.

Further, the present invention proposes a continuous unloader of another type. Such a continuous unloader, having an endless bucket conveyer that is engagedly taken on upper sprockets, lower sprockets (provided below the upper ones) and front sprockets (provided in front of the lower ones) includes a base part that is connected to the lower end of a support frame that supports the upper sprockets by way of an elevation/lowering mechanism such that the base part supports the front sprockets and the lower sprockets. The front and the lower sprockets are connected to the base part by way of the link mechanism such that the front sprockets and the lower sprockets are lowered when the distance between them is narrowed and the front sprockets and the lower sprockets are raised when the distance between them is widened.

The elevation/lowering mechanism may include a parallel link mechanism that has: upper holding links of which one end is connected to the base part and of which the other end is connected to the lower end of the support frame; and lower holding links of which one end is connected to the base part such that the lower holding link is in parallel with the upper holding link and of which the other end is connected to the lower end of the support frame.

The link mechanism may include main links of which one end is connected to the base part and of which the other end is connected to the front sprockets, assistant links of which one end is connected to the midpoint of the corresponding main link and of which the other end is connected to the lower sprockets side, stay links of which one end is connected to the midpoint of the corresponding assistant link and of which the other end is connected to the base part.

DESCRIPTION OF THE PREFERRED EMBODIMENTS

The preferred embodiments of the present invention will be described with reference to the accompanying drawings.

Figure 1:
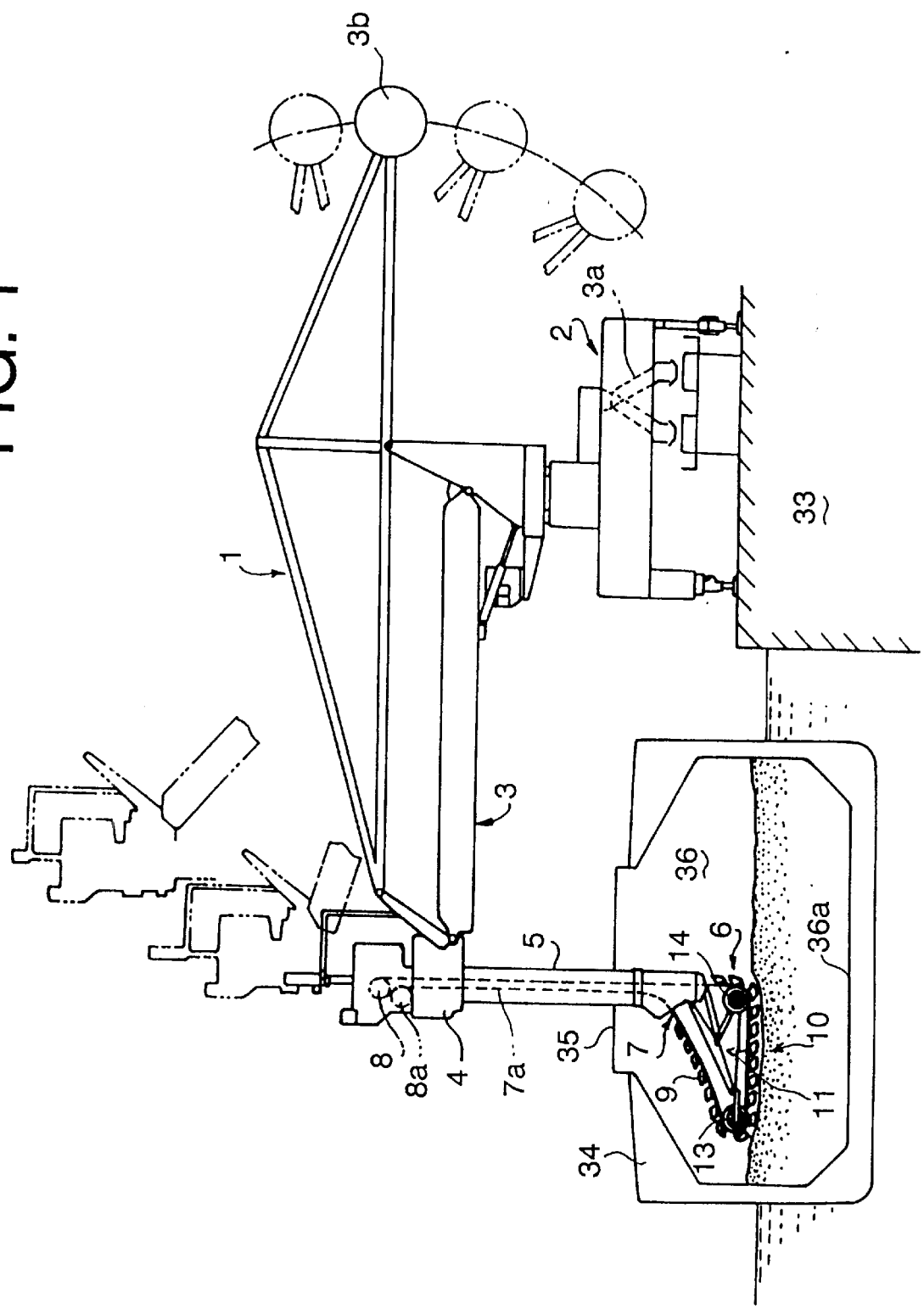
FIG. 1 is a side view showing the whole structure of a continuous unloader according to one embodiment of the present invention.

As shown in FIG. 1, a continuous unloader 1 is used for unloading bulk cargo accommodated in a ship hold 36 of a ship 34 onto a quay 33. The continuous unloader 1 includes a running part 2 that runs on the quay 33, a boom 3 that is provided on the running part 2 such that it 3 extends toward the sea and is capable of making slewing and tilting movements, a frame 5 (called "slew mast 5 hereinafter) that is provided at the tip end of the boom 3 by way of a top support frame 4 such that it 5 is plumbs down from the top support frame 4 and is capable of making rotational movements about its vertical axis, and endless bucket conveyer 7 that are provided in the slew mast 5.

The continuous unloader 1 further includes upper sprockets 8 that are provided at the upper position of the slew mast 5, lower sprockets 14 that are provided vertically below the upper sprockets 8, front sprockets 13 that are provided in front (the horizontally left direction in FIG. 1) of the lower sprockets 14. The lower end of the bucket conveyer 7 is inserted into the ship hold 36 through a hatch 35 of the ship 34 such that the bucket conveyer 7 can dig up the bulk cargo accommodated in the ship hold 36. The bucket conveyer 7 includes chains 7a that are circularly taken up by the upper sprockets 8, the lower sprockets 14 and the front sprockets 13, and a plurality of buckets 9 that are circularly provided on (and between) the chains 7a with a predetermined distance between each other. The upper sprockets 8 are driven by a drive device (not shown) counterclockwise in FIG. 1. Reverse sprockets 8a for turning over the buckets 9 are provided under the upper sprockets 8.

Figure 2:
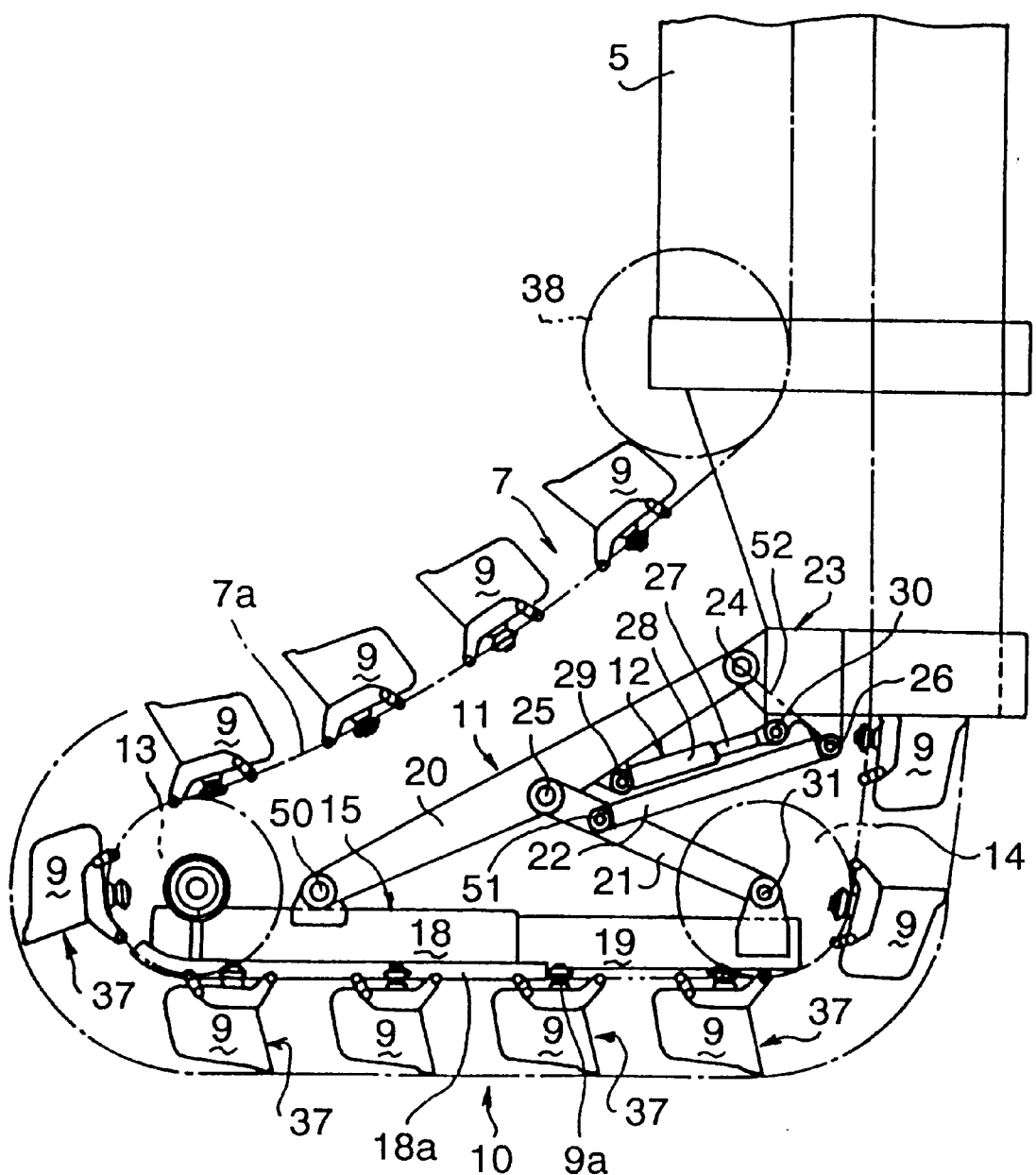
FIG. 2 is an enlarged diagram of a digging portion of FIG. 1.

According to this arrangement, by driving the upper sprockets 8, the bucket conveyer 7 is circulated such that it 7 moves from the upper sprockets 8 to the front sprockets 13 via the reverse sprockets 8a and returns to the upper sprockets 8 via the lower sprockets 14. During the circulation, as shown in FIG. 2, each bucket 9 digs up bulk cargo from its opening 37 between the front sprockets 13 and the lower sprockets 14 and lifts up the dug bulk cargo from the lower sprockets 14 to the upper sprockets 8. Then, the opening 37 of each bucket 9 is turned over between the upper sprockets 8 and the reverse sprockets 8a such that the dug bulk cargo is dropped onto a table feeder (not shown) provided in the top support frame 4. The bulk cargo dropped on the table feeder is carried and unloaded onto the quay 33 by way of a conveyer that is provided in the boom 3 (not shown), a chute 3a and the like.

Figure 3:
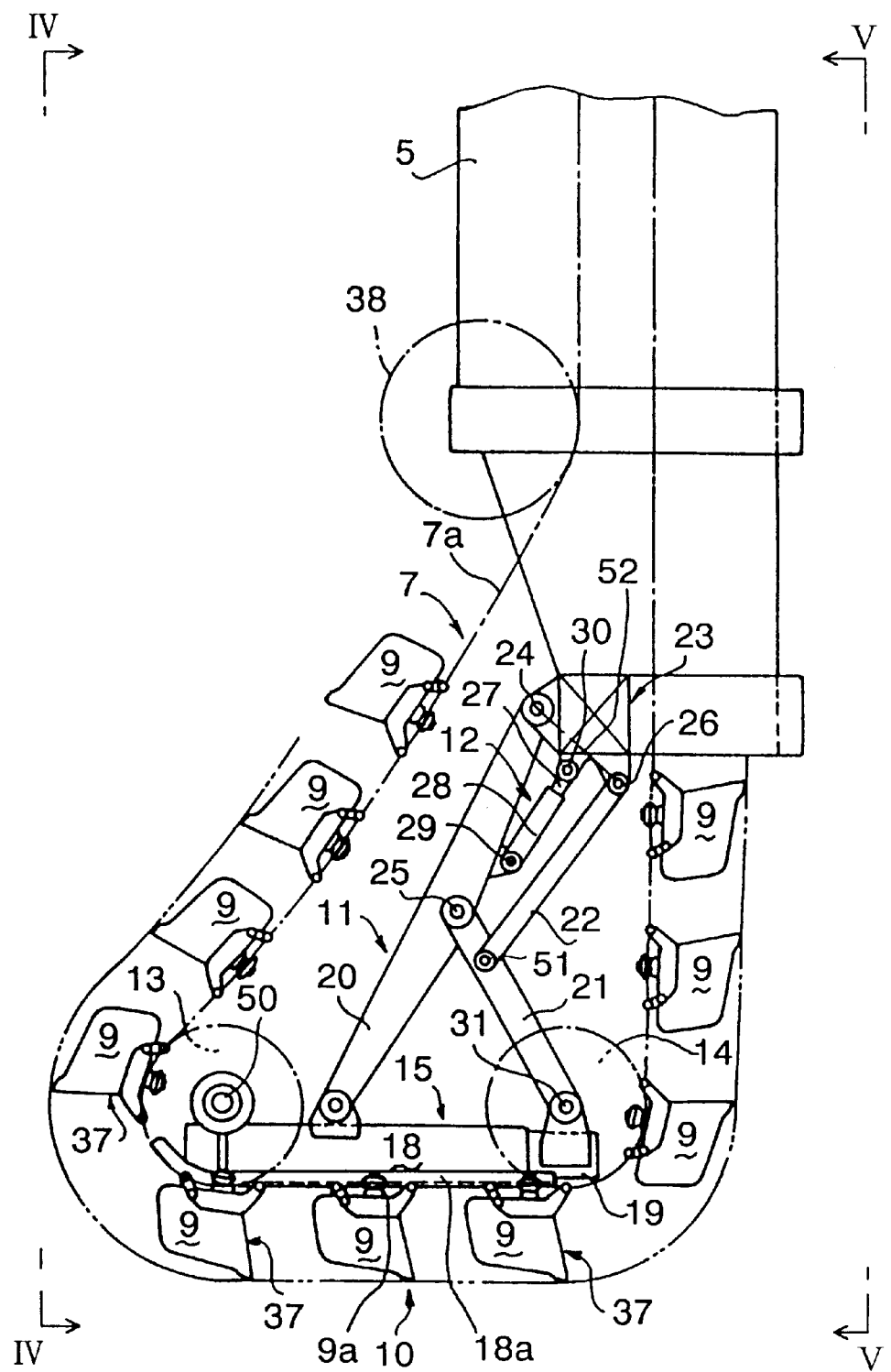
FIG. 3 is an enlarged diagram showing a state in which the digging portion of FIG. 2 is retracted.

As shown in FIG. 2 and FIG. 3, the front sprockets 13 are provided at one end of an extensible/retractable frame 15 and the lower sprockets 14 are provided at the other end (the one closer to the slew mast 5) of the extensible frame 15. The extensible/retractable frame 15 has an inner cylinder 19 and an outer cylinder 18, and the inner cylinder 19 is installed in the outer cylinder 18 such that each can be telescopically extracted/retracted as desired. In addition, a fixation frame 23 is provided at the lower end of the slew mast 5 such that the inner cylinder 19 and the outer cylinder 18 can be suspended from the slew mast 5 by way of a link mechanism 11.

The link mechanism 11 includes: a main link 20 of which one end is connected to the fixation frame 23 at a connection point 24 and of which the other end is connected to the outer cylinder 18 at a connection point 50; an assistant link 21 of which one end is connected to the midpoint of the main link 20 at a connection point 25 and of which the other end is connected to the inner cylinder 19 at a connection point 31; a stay link 22 of which one end is connected to the midpoint of the assistant link 21 at a connection point 51 and of which the other end is connected to the fixation frame 23 at a connection point 26; and a "virtual" link 52 of which one end is the connection point 25 (24) of the main link 20 with the fixation frame 23 and of which the other end is the connection point 26 of the stay link 22 with the fixation frame 23. Each link 20,21,22,52 is connected by pins.

The link mechanism 11 described above may be provided with a cylinder 12 that functions as an actuator for changing the shape and position of the link mechanism 11 and retain the changed shape/position. The cylinder 12 has a rod portion 27 and a head portion 28. The rod portion 27 of the cylinder 12 is connected to the fixation frame 23 at connection point 30 by a pin and the head portion 28 of the cylinder 12 is connected to the main link 20 at a connection point 29 by a pin. When the cylinder 12 is retracted from its extended state shown in FIG. 2, the link mechanism 11 is operated and the inner cylinder 19 is withdrawn into the outer cylinder 18 as shown in FIG. 3. With this retracting motion, the distance between the front and the lower sprockets 13, 14 is narrowed without tilting the horizontal line between the sprockets 13, 14 and the vertical position of these sprockets 13, 14 are lowered. This distance-narrowing and dropping motion will be described in detail later.

In the present embodiment, the connection point 30 of the cylinder 12 on the fixation frame 23 side is located between the connection point 24 and the connection point 26 and the connection point 29 of the cylinder 12 on the main link 20 side is located between the connection point 25 and the connection point 24. However, the location of these connection points 30,29 is not limited to that particular position. For example, one end of the cylinder 12 may be connected to any suitable site of the fixation frame 23 by a pin and the other end of the cylinder 12 may be connected to any suitable site of the stay link 22 or the assistant link 21 by a pin. Further, the cylinder 12 may be provided between the main link 20 and the assistant link 21, or between the assistant link 21 and the stay link 22, or between the stay link 22 and the main link 20. In short, the cylinder 12 may be provided anywhere as long as it 12 can function as an actuator for operating the link mechanism 11 by its extension/retraction movement.

Figure 4:
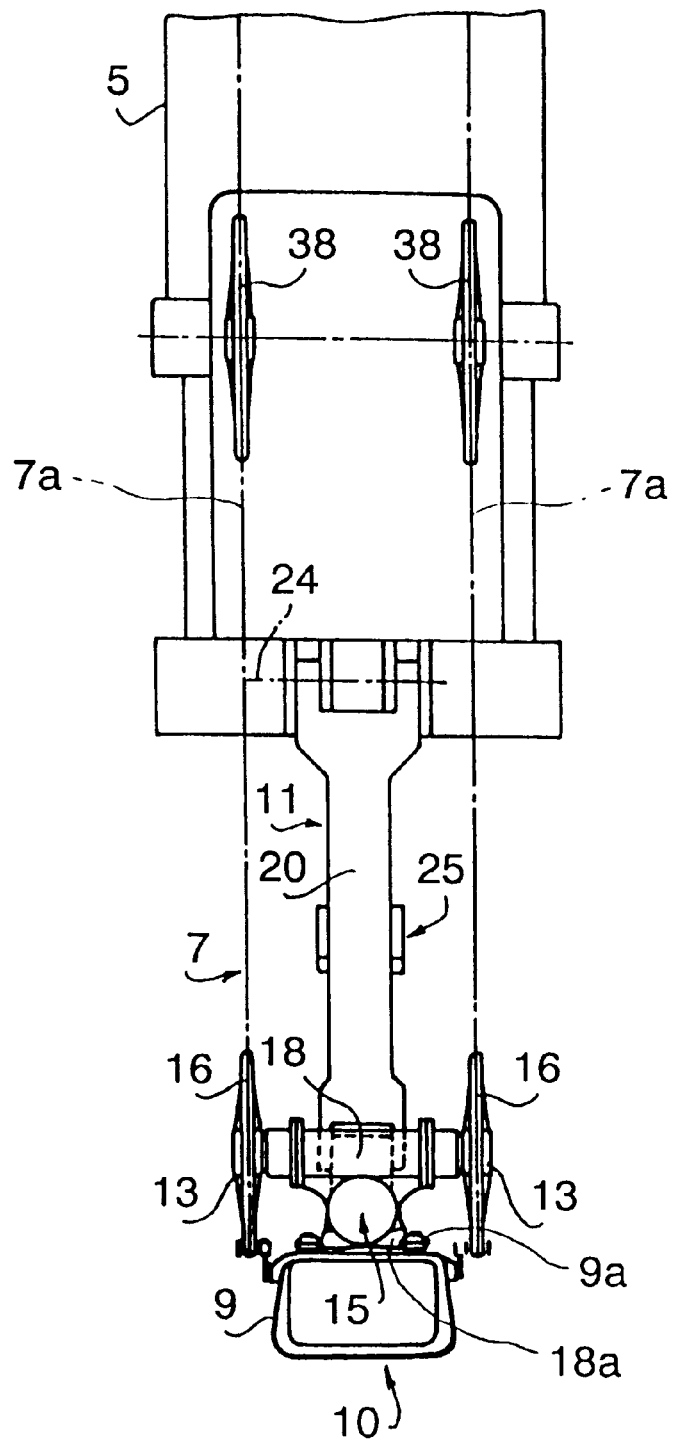
FIG. 4 is a side view from the IV—IV line of FIG. 3.
Figure 5:
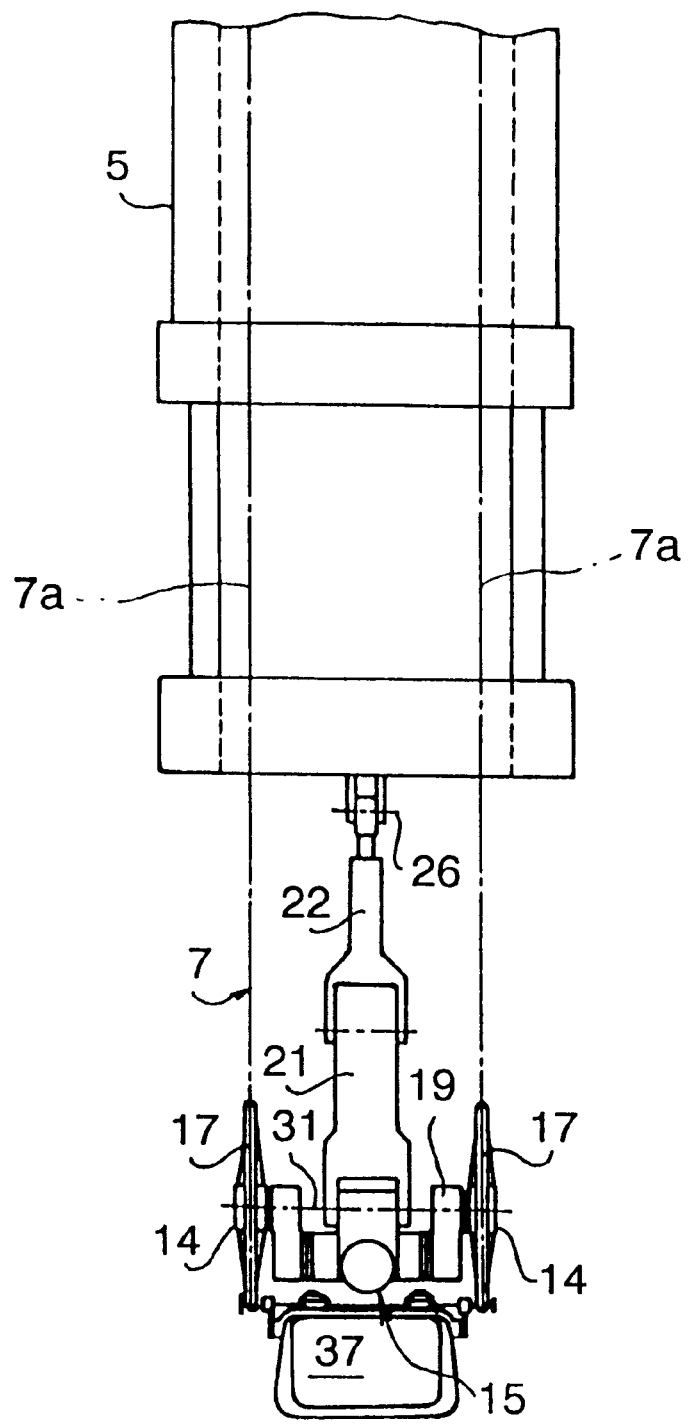
FIG. 5 is a side view from the V—V line of FIG. 3.

FIG. 4 is a side view of FIG. 3 viewed from its left hand side. FIG. 5 is a side view of FIG. 3 viewed from its right hand side. As shown in these drawings, a pair of chains 7a of the bucket conveyer 7 is provided with a predetermined distance between each other. A plurality of buckets 9 is provided between the chains 7a, 7a such that each bucket 9 transversely bridges both chains 7a, 7a. As there are a pair of chains 7a, 7a, a pair of front sprockets 13 and a pair of lower sprockets 14 are provided such that each sprocket 13, 14 corresponds with each chain 7a. Likewise, a pair of guide sprockets 38 is provided diagonally upward of the lower sprockets 14 such that each sprocket 38 corresponds with each chain 7a.

One example of actual dimension of each link 20, 21, 22 and the virtual link 52 is as follows. The length of the main link 20 is about 3411 mm, that of the assistant link 21 is about 1806 mm, that of the stay link 22 is about 2252 mm, and that of the virtual link 23 (52) is about 1226 mm. The connection point 24 is vertically shifted by 274 mm and horizontally shifted by 1195 mm from the connection point 26. The distance between the connection point 24 and the connection point 25 is about 1600 mm. The connection point 51 of the stay link 22 with the assistant link 21 is designed such that the lower end of the main link 20 and that of the assistant link 21 come to the same vertical position during the operation of the link mechanism 11.

Next, operations according to the present embodiment will be described hereinbelow.

As shown in FIG. 1, when the lower end of the bucket conveyer 7 of the continuous unloader 1 is inserted into the ship hold 36 through the hatch 35 of the ship 34, after the bucket conveyer 7 is positioned above the hatch 35 by operating the boom 3, the cylinder 12 is retracted from its extended state (Refer to FIG. 2) to its retracted state (Refer to FIG. 3) such that the link mechanism 11 is operated and the distance between the front and the lower sprockets 13, 14 is narrowed to a width that allows easy passing of the sprockets 13, 14 through the hatch 35.

Figure 6:
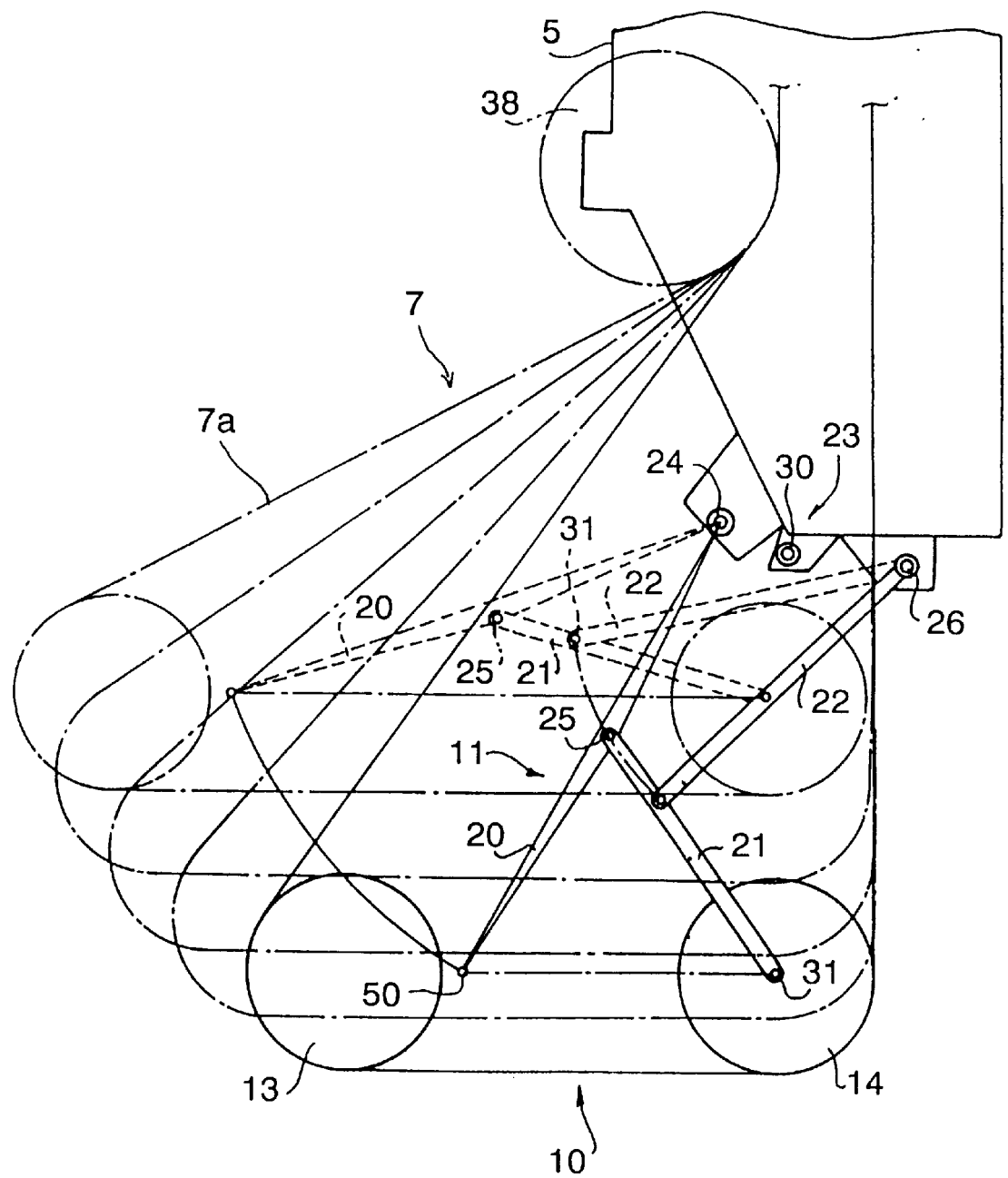
FIG. 6 is a explanatory diagram showing the movement of a link mechanism when it is operated from the state of FIG. 2 to that of FIG. 3.

At this time, the link mechanism 11 is operatively moved from the position shown in the broken lines to the position shown in the continuous lines in FIG. 6. More specifically, when the cylinder 12 is retracted, the main link 20 is rotated counterclockwise about the connection point 24, the assistant link 21 is rotated clockwise about the connection point 25 and the stay link 22 is rotated counterclockwise about the connection point 26. The assistant link 21 is rotated clockwise about the connection point 25, which is different from the other links 20, 22, because movement of the assistant link 21 by the main link 20 is suppressed by the stay link 22. As a result, the connection point 50 of the main link 20 moves down along a curved locus and the connection point 31 of the assistant link 21 substantially plumbs down (Refer to FIG. 6).

Due to this, the inner cylinder 19 connected to the connection point 31 is pushed into the outer cylinder 18 connected to the connection point 50 and thus the distance between the front and the lower sprockets 13, 14 is narrowed. At the same time, the position of the front and the lower sprockets 13, 14 is vertically lowered without tilting the horizontal line between the both sprockets 13, 14, thus increasing the distance between the both sprockets 13, 14 and the upper sprockets 8. Owing to this widened distance between the sprockets 13, 14 and the upper sprockets 8, the chains 7a of the bucket conveyer 7 can avoid having excessive slack during the operation of the link mechanism 11. In short, the slack that is generated in the chains 7a when the distance between the front and the lower sprockets 13, 14 is narrowed is absorbed or canceled out by the widened distance between the these sprockets 13, 14 and the upper sprockets 8.

After narrowing the distance between the front and the lower sprockets 13, 14 as described above, the slew mast 5 is lowered by tilting the boom 3 such that the lower end of the bucket conveyer 7 is inserted into the hatch 35. The cylinder 12 is then extended again and the link mechanism 11 is operatively moved from the position shown in the continuous lines to the position shown in the broken lines in FIG. 6. As a result, the connection point 50 of the main link 20 moves up along the curved locus and the connection point 31 of the assistant link 21 is lifted up in the substantially vertical direction.

Due to this, the inner cylinder 19 is withdrawn from the outer cylinder 18 and thus the distance between the front and the lower sprockets 13, 14 is widened. At the same time, the position of the front and the lower sprockets 13, 14 is vertically lifted up without tilting the horizontal line between the both sprockets 13, 14 and thus the distance between the both sprockets 13, 14 and the upper sprockets 8 is narrowed. Owing to this shortened distance between the sprockets 13, 14 and the upper sprockets 8, the chains 7a of the bucket conveyer 7 can avoid having excessive slack nor tense during the operation of the link mechanism 11. In short, the tense that is generated in the chains 7a when the distance between the front and the lower sprockets 13, 14 is widened is relieved by the narrowed distance between the these sprockets 13, 14 and the upper sprockets 8.

After completing the adjustment of the distance between the front and the lower sprockets 13, 14, the slew mast 5 is again lowered such that the vertical position of the front and the lower sprockets 13, 14 is lowered and the buckets 9 of the bucket conveyer 7 between the front and the lower sprockets 13, 14 can touch the bulk cargo in the ship hold 36. Then, the upper sprockets 8 are driven by the drive device (not shown) such that the endless bucket conveyer 7 is rotated counterclockwise in FIG. 1.

Due to the operation described above, the bulk cargo in the ship hold 36 is dug up by the bucket conveyer 7 between the front and the lower sprockets 13, 14 and the dug bulk cargo is lifted up by the bucket conveyer 7 between the lower sprockets 14 and the upper sprockets 8. The buckets 9 are then turned over by the reverse sprockets 8a such that the bulk cargo is dropped onto the table feeder (not shown) that is provided in the top support frame 4. The dropped bulk cargo is carried by a conveyer (not shown) that is provided in the boom 3, the chutes 3a and the like and is unloaded onto the quay 33.

More specifically, the slew mast 5 is slewed about its vertical axis or moved in the horizontal direction and the bucket conveyer 7 is circulated such that the bucket conveyer 7 between the front and the lower sprockets 13, 14 (called the digging portion 10 hereinafter) evenly digs up the bulk cargo surface in the ship hold 36 with always keeping the height of the bulk cargo surface in the hold roughly even. When the front sprockets 13 of the digging portion 10 reach an inner corner of the ship hold 36 of rectangular shape, the slew mast 5 is slewed about its vertical axis and the direction of the digging portion 10 is changed.

At this time, the slew mast 5 is stewed and the length of the digging portion 10 is extended/retracted such that the front sprockets 13 are moved along the right-angled corner line of the ship hold 36 and no bulk cargo is left undug. In addition, since the digging portion 10 is vertically lifted up as described above when it 10 is extended, the mask 5 is to be lowered according to the degree of extension of the digging portion 10 such that the buckets 9 continue to touch the bulk cargo.

When unloading of bulk cargo in the ship hold 36 is completed, the cylinder 12 is retracted such that the digging portion 10 is retracted to a length that allows its easy passing through the hatch 35. The slew mast 5 is then lifted up and the bucket conveyer 7 is brought out of the ship hold 36 through the hatch 35.

As described above, since the front and lower sprockets 13, 14 are suspended from the lower end of the slew mast 5 by way of the link mechanism 11 and the digging portion 10 is extended/retracted and lifted up/lowered by operating the link mechanism 11 with the cylinder 12, the conventional extensible/retractable cylinder r having the inner cylinder o and the outer cylinder p (Refer to FIG. 28) is no longer needed and the cylinder 12 is the only means needed for achieving the extension/retraction and associated up/down motion of the digging portion 10. Therefore, the weight of the whole system can be significantly reduced.

Figure 28:
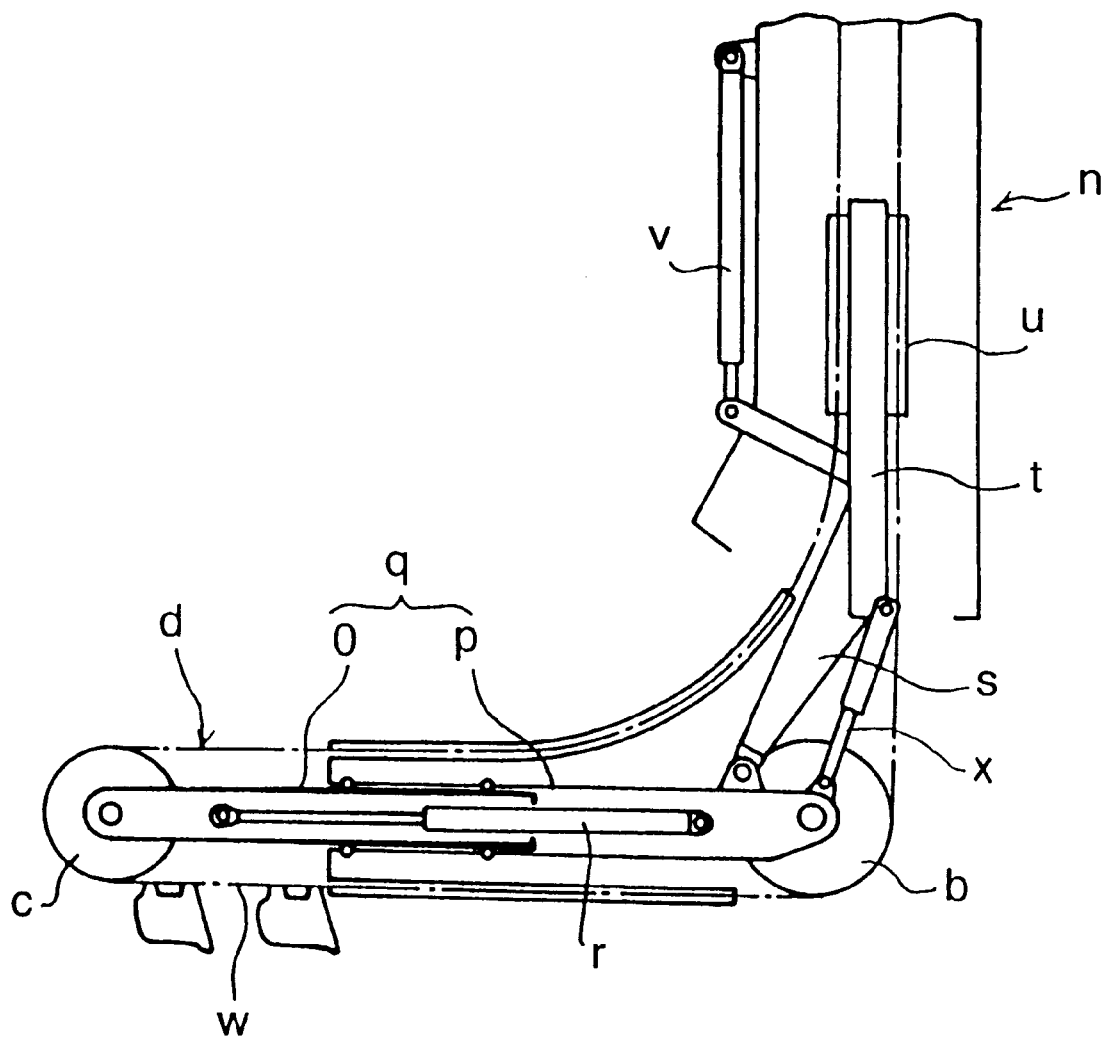
FIG. 28 is a side view of a digging portion of the continuous unloader of FIG. 27.

Further, as an extension/retraction stroke of the cylinder 12 acts on the distance adjustment of the front and the lower sprockets 13, 14 after being amplified by the lever ratio of the link mechanism 11, the cylinder 12 is required to have a smaller extension/retraction stroke than the conventional extensible/retractable cylinder r shown in FIG. 28. This allows using a relatively small cylinder 12 and thus reduces its weight and cost.

More specifically, in the conventional device shown in FIG. 28, the distance adjustment and the up/down motion of the front sprockets c and the lower sprockets b are each performed by the extensible/retractable cylinder r and the up/down cylinder v, respectively. Herein, the up/down cylinder v must be of relatively large size because it v is required to have lift-up force large enough for lifting up the extensible/retractable cylinder r as well, making the whole device large and heavy. However, according to the present embodiment, operation of just one cylinder 12 is enough for achieving the distance adjustment (and associated up/down motion) of the front and the lower sprockets 13, 14. Thus, the cylinder 12 can be designed relatively small, making the whole system smaller and less heavy.

In addition, the front sprockets 13 is provided at one end of the extensible/retractable frame 15 (the frame 15 has the inner cylinder 19 and the outer cylinder 18) and the lower sprockets 14 is provided at the other end of the extensible/retractable frame 15. As the distance between the front sprockets 13 and the lower sprockets 14 is adjusted by extending/retracting the inner cylinder 19 from/into the outer cylinder 18 by way of the link mechanism 11, the distance adjustment of the front and the lower sprockets 13, 14 can be smoothly carried out due to the guidance of the inner and outer cylinders 19, 18.

Further, as the mounting dimension of each link of the link mechanism 11 is adequately set in the present embodiment, the digging portion 1 (10) is automatically elevated/lowered synchronous with its 10 extension/retraction by the cylinder 12 such that no excessive tense or slack be generated in the chains 7a of the bucket conveyer 7. Thus, the complicated synchronicity control of the extensible/retractable cylinder r and the up/down cylinder v required in the conventional art shown in FIG. 28 is no longer needed.

It should be noted that the mounting dimension of each link of the link mechanism 11 is not limited to that described above but may be any dimension as long as it satisfies the conditions listed below: 1) No excessive slack or tense s should be generated in the chains 7a of the bucket conveyer 7 during the simultaneous operation of extension/retraction and elevation/lowering of the digging portion 10; 2) The digging portion 10 should be elevated/lowered without tilting the substantially horizontal line between its two sprockets 13, 14; 3) The lower sprockets 14 should be elevated/lowered along the substantially vertical axis without deflecting to the horizontal direction.

By the way, as shown in FIG. 2, the continuous unloader 1 where the digging portion 10 is extended/retracted by providing the link mechanism 11 between the slew mast 5 and the digging portion 10 does not have any means for tilting the digging portion 10. Herein, since change in the position of each link of the link mechanism 11 causes the digging portion 10 to extend/retract and this extension/retraction further operates each link such that the digging portion 10 be elevated/lowered, a cylinder for tilting the digging portion 10 such as the cylinders shown in FIG. 28 cannot simply be provided between the slew mast 5 and the digging portion 10.

Figure 7:
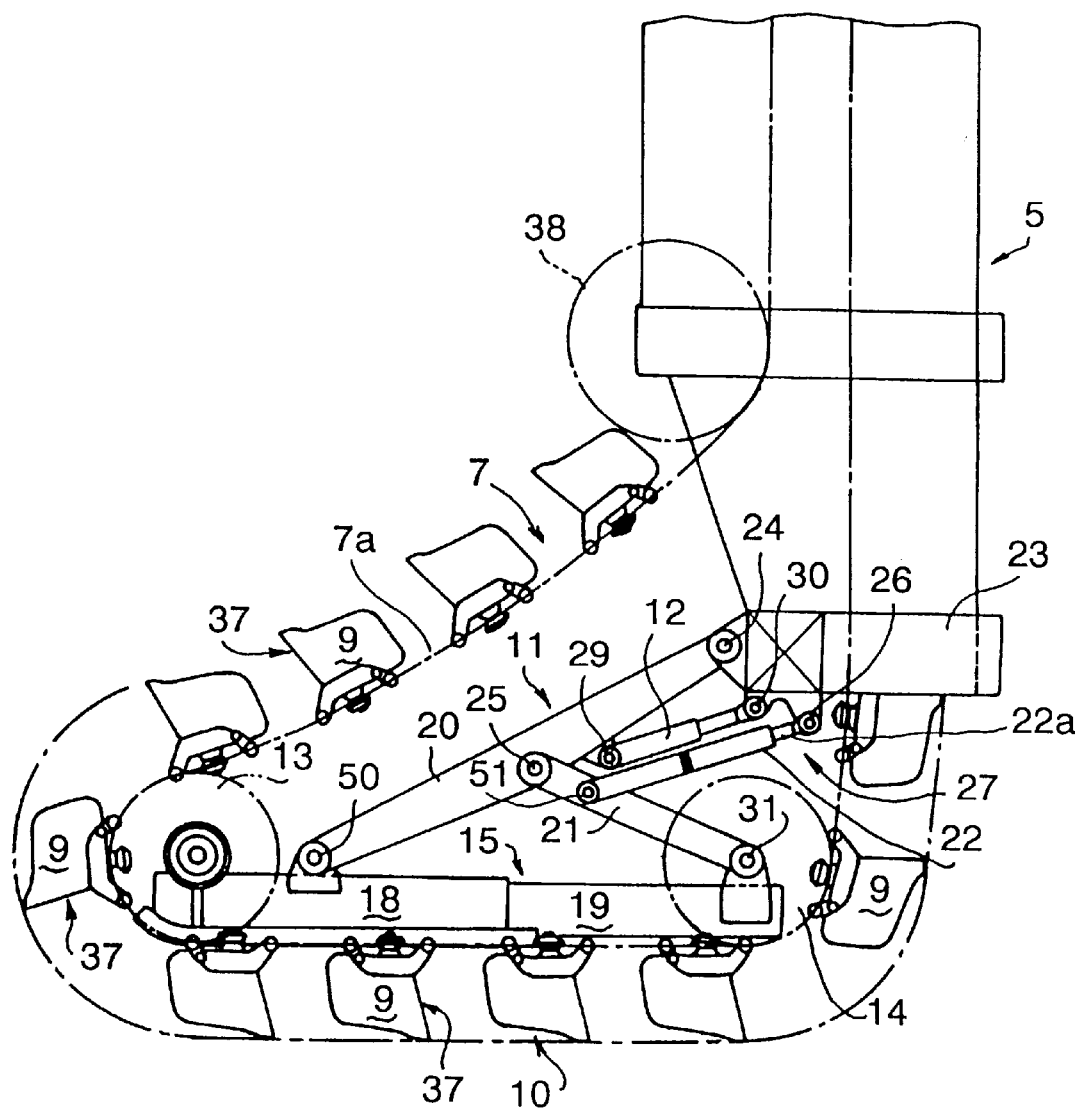
FIG. 7 is an enlarged diagram of a digging portion of a continuous unloader that has a cylinder installed in a stay link of its link mechanism.
Figure 8:
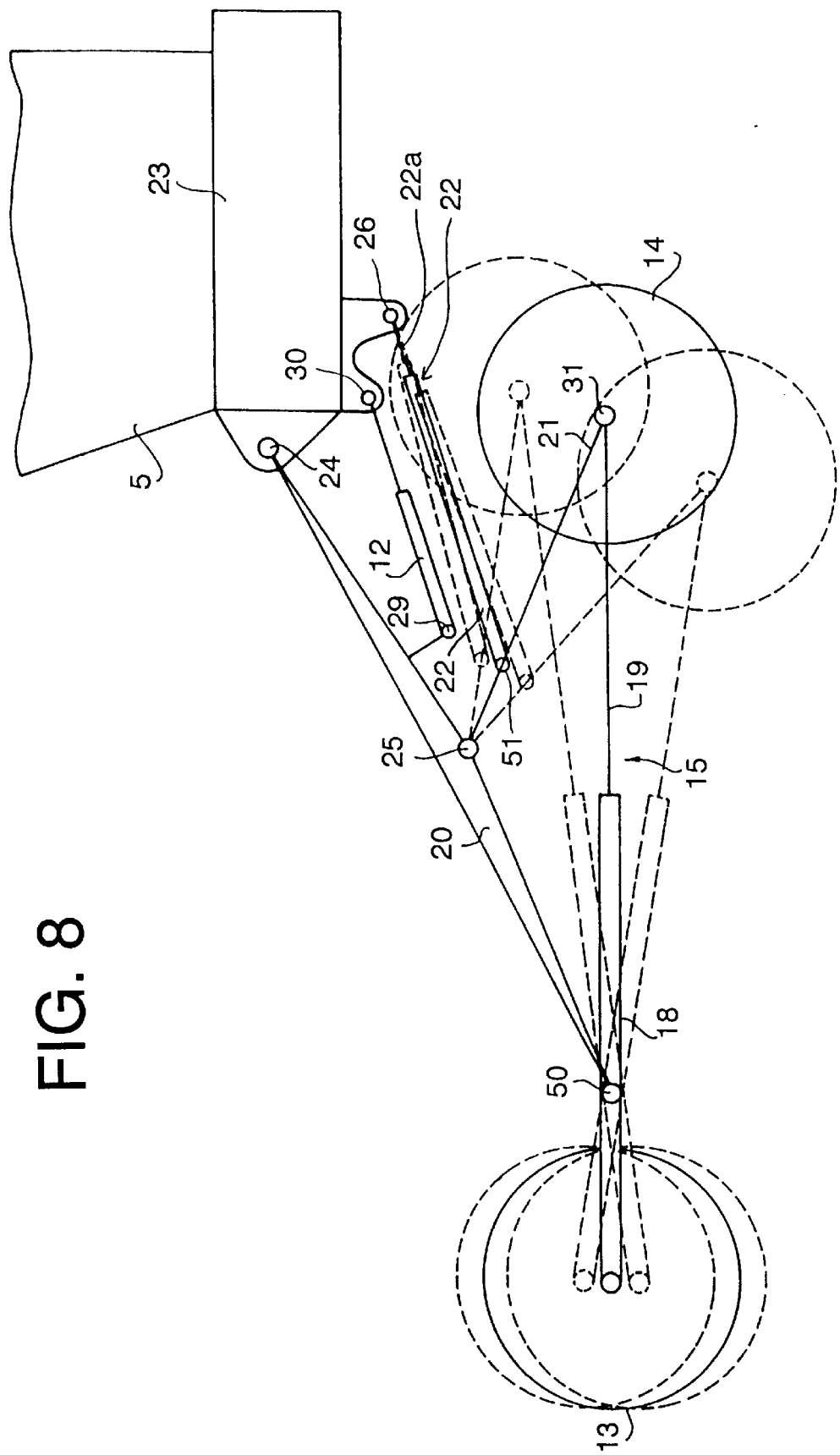
FIG. 8 is a side view showing the tilting movement of the digging portion of FIG. 7 due to extending/retracting of the cylinder.

Therefore, the present invention further proposes a continuous unloader of another type in which a cylinder 22a for adjusting the length of the stay link 22 is provided in the stay link 22 (Refer to FIG. 7) and the digging g portion 10 is tilted against the horizontal line by extending/retracting the cylinder 22a (Refer to FIG. 8). This continuous unloader of another (modified) type will be described hereinbelow.

As shown in FIG. 7 and FIG. 8, the cylinder 22a for adjusting the length of the stay link 22 is installed in the stay link 22 in this modification. On the other hand, the other components of this continuous unloader are generally similar to the previously described type and thus as for them the like reference numbers are assigned to the like components, omitting further description.

Figure 9:
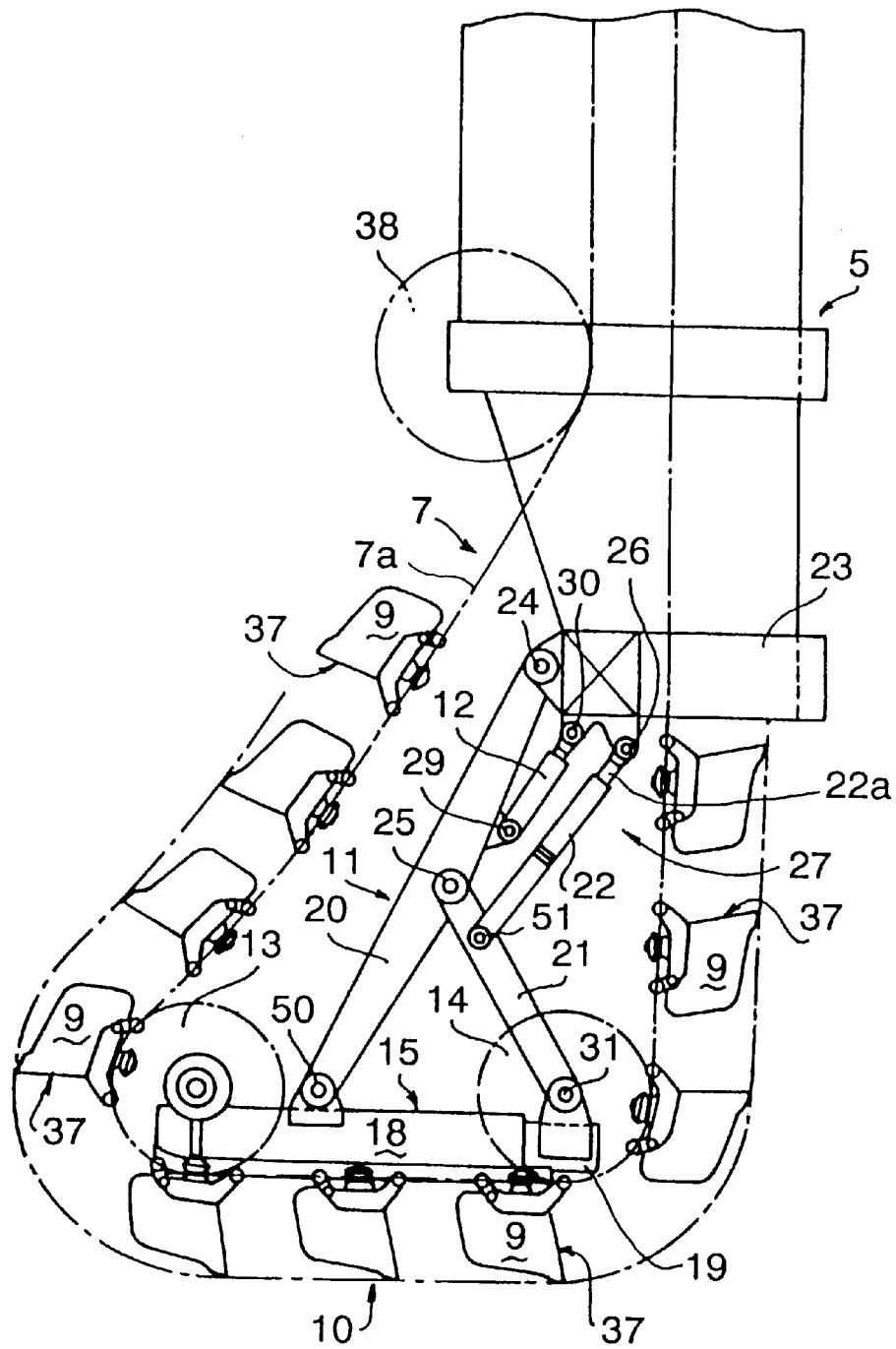
FIG. 9 is an enlarged diagram showing a state in which the digging portion of FIG. 7 is retracted.

When the digging portion 10 of the bucket conveyer 7 of the continuous unloader 1 is inserted into the ship hold 36 through the hatch 35 of the ship 34 and the like, after the digging portion 10 is positioned above the hatch 35, the cylinder 12 is retracted from its extended state as described above with maintaining the length of the stay link 22 such that the length of the digging portion 10 is narrowed to a length that allows its 10 easy passing through the hatch 35 (Refer to FIG. 9).

At this time, due to the retraction of the cylinder 12, the main link 20 is pulled down in the rear-down direction and the outer cylinder 18 is subject to rearward retraction and downward lowering. In addition, as one end of the assistant link 21 is connected to the midpoint of the main link 20, the assistant link 21 receives a force that pushes down the assistant link 21 rearward and downward. However, since the assistant link 21 is suppressed by the stay link 22 that is connected to its 21 midpoint such that it is not moved rearward, it 21 is not simply pushed down rearward plus downward but it rather rotates its connection point 31 with the inner cylinder 19 forward plus downward against the main link 20. Then, as the velocity at which the main link 20 is pushed rearward and the velocity at which the stay link 22 is pushed forward are substantially the same and canceled out each other, the connection point 31 plumbs down along the vertical axis.

Next, the slew mast 5 is lowered down by tilting the boom 3 such that the digging portion passes through the hatch 35. After this passing, the length of the digging portion 10 is adjustingly extended by extending the cylinder 12 with remaining the length of the stay link 22 (Refer to FIG. 7) such that the front tip of the digging portion 10 can reach an inner corner of the ship hold 36.

During the operation described above, due to the extension of the cylinder 12, the main link 20 is pushed up in the front-up direction and the outer cylinder 18 is subject to forward extension and upward elevation. In addition, as one end of the assistant link 21 is connected to the midpoint of the main link 20, the assistant link 21 receives a force that pulls up the assistant link 21 forward and upward. However, since the assistant link 21 is suppressed by the stay link 22 that is connected to its 21 midpoint such that it is not moved forward, it 21 is not simply pulled up forward plus upward but it rather rotates its connection point 31 with the inner cylinder 19 rearward plus upward against the main link 20. Then, as the velocity at which the main link 20 is pulled forward and the velocity at which the stay link 22 is pulled rearward are substantially the same and canceled out each other, the connection point 31 is vertically elevated.

At the next stage, the slew mast 5 is lowered down by tilting the boom 3 such that the digging portion 10 can dig up the bulk cargo in the ship hold 36. When the ship body becomes tilted due to its trimming, the stay link 22 is extended/retracted with maintaining the length of the cylinder 12 such that the digging portion 10 is tilted corresponding to the tilting angle of the ship base. If the digging portion 10 is to be tilted such that its front is lowered, the stay link 22 is retracted with maintaining the length of the cylinder 12. If the digging portion 10 is to be tilted such that its rear is lowered, the stay link 22 is extended with maintaining the length of the cylinder 12.

Herein, if the stay link 22 is retracted while the length of the cylinder 12 is kept constant, the assistant link 21 is upwardly rotated about the connection point 25 according to the retraction of the stay link 22 and thus the rear end of the extensible/retractable frame 15 is pulled up in the rear-up direction. As the length of the cylinder 12 is kept constant, the main link 20 is not rotated about the connection point 24 upward nor downward, but the front end of the extensible/retractable frame 15 is downwardly rotated about the connection point 50 with the main link 20 and the inner cylinder 19 is rearwardly withdrawn from the outer cylinder 18 of which horizontal movement is suppressed by the main link 20. As a result, the extensible/retractable frame 15 is extended.

Conversely, if the stay link 22 is extended while the length of the cylinder 12 is kept constant, the assistant link 21 is downwardly rotated about the connection point 25 according to the extension of the stay link 22 and thus the rear end of the extensible/retractable frame 15 is downwardly pushed down. As the length of the cylinder 12 is kept constant, the main link 20 is not rotated about the connection point 24 upward nor downward, but the front end of the extensible/retractable frame 15 is upwardly rotated about the connection point 32 (50) with the main link 20 and the inner cylinder 19 is pushed into the outer cylinder 18 of which horizontal movement is suppressed by the main link 20. As a result, the extensible/retractable frame 15 is retracted.

After completion of unloading the bulk cargo, the length of the digging portion 10 is narrowed to a length that allows its easy passing through the hatch 35 by retracting the cylinder 12 while the length of the stay link 22 is kept constant. The slew mast 5 as well as the digging device 6 is lifted upward and brought out of the ship hold 36 through the hatch 35.

In short, as the tilting motion of the digging portion 10 of the continuous unloader 1 is achieved by extending/retracting the stay link 22 that is one of the components of the link mechanism 11, the digging portion 10 can be tilted by a device of very simple structure and low cost.

It should be noted that the up/down motion and the tilting motion of the digging portion 10 may be simultaneously controlled by performing the extension/retraction of the cylinder 12 and that of the stay link 22 simultaneously.

By the way, when the bulk cargo in the ship hold 36 is to be cleaned up without leaving any left-over, the buckets 9 of the digging portion 10 are required to slightly touch the ship hold floor 36a. In this case, since the ship is swung due to change in cargo weight or waves, the digging portion 10 must be resiliently held such that it can flexibly follow the swinging motion of the ship hold floor 36a. However, the digging portion has to be fixedly held during the normal digging operation that does not intend to perform such a cleaning up.

Figure 10:
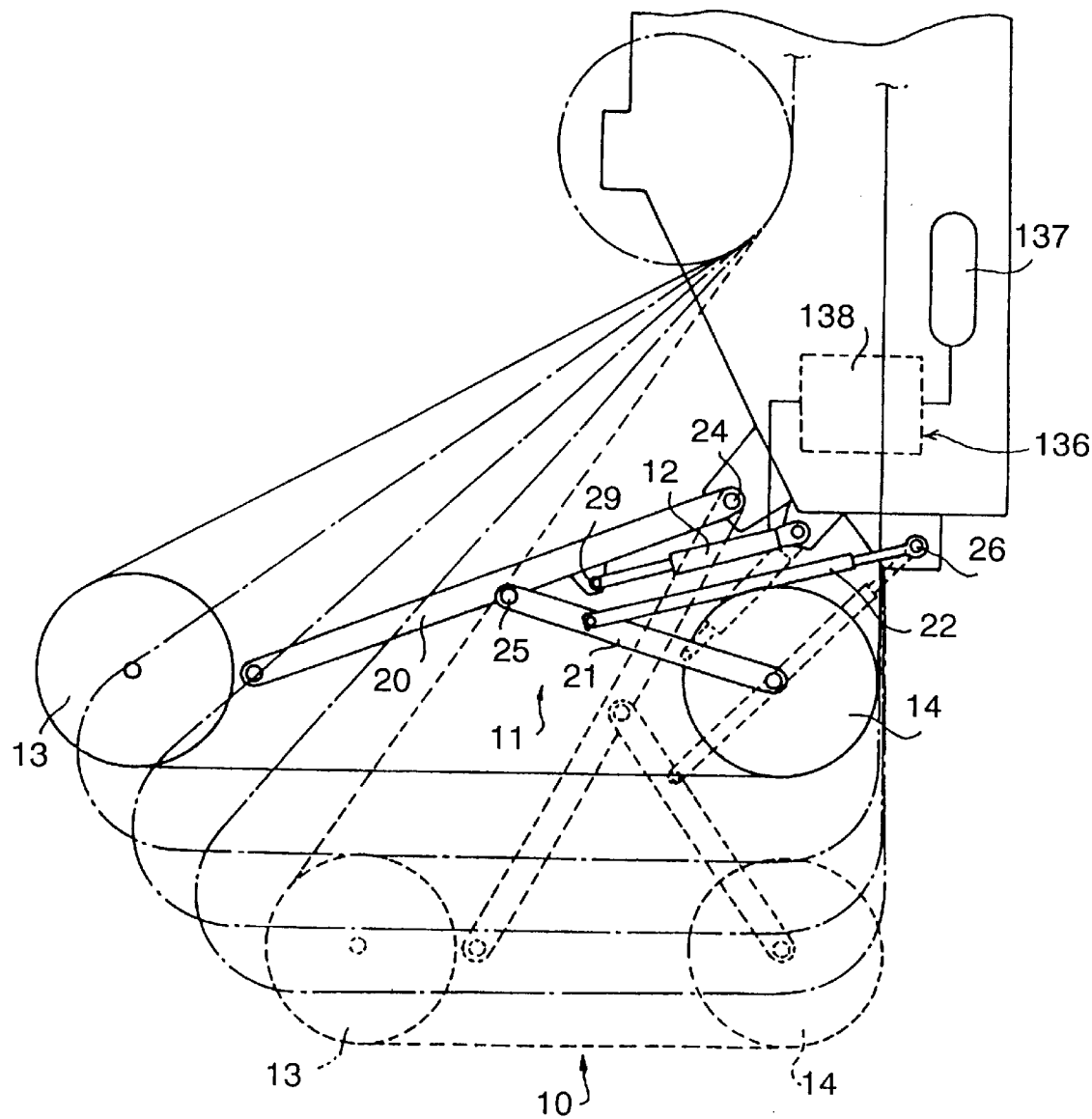
FIG. 10 is an enlarged diagram of a part of a continuous unloader having control means that is connected to a cylinder which holds the link mechanism such that the control means can resiliently retain the link mechanism.

Therefore, in order to realize a continuous unloader that is capable of two ways (fixed and resilient) of holding the digging portion 10, the present invention proposes a continuous unloader of yet another (modified) type shown in FIG. 10 wherein control means 136 that is connected to the cylinder 12 is provided for adjusting the holding force of the link mechanism 11 by the cylinder 12. According to this modified continuous unloader, when the digging portion 10 is to touch the ship hold floor 36a for cleaning up, the digging portion 10 is resiliently held by weakening the holding force of the cylinder 12 with using the control means 136. Accordingly, if the ship hold floor 36a is swung due to waves etc., the digging portion 10 can flexibly follow such swinging. On the other hand, during the normal (non-cleaning up) operation, the digging portion 10 is fixedly held by increasing the holding force of the cylinder 12 with using the control means 136.

The control means 136 includes an hydraulic circuit 138 for controlling hydraulic pressure to the cylinder 12. The hydraulic circuit 138 is provided with an accumulator 137 that supplies a predetermined level of hydraulic pressure to the cylinder 12. The level of the hydraulic pressure that is supplied by the accumulator 137 is determined such that it is just enough for holding some of the digging portion 10 weight. More specifically, the holding force of the accumulator 137 is set such that is slightly smaller than the weight of the digging portion 10. Due to this arrangement, the pressure that the ship hold floor 36a receives from the digging portion 10 when the digging portion 10 touches the floor 36a can be made as small as possible. The continuous unloader of this type will be described hereinbelow.

When no driving force is applied on it, the cylinder 12 is naturally retracted as shown with the broken lines in FIG. 10 because the digging portion 10 (the front and the lower sprockets 13, 14 and the extensible/retractable frame 15) is lowered due to the gravity force and the main link 20 is rotated counterclockwise. Thus, an extra hydraulic pressure that compensates the gravity-biased force must be provided when the cylinder 12 is to be extended. If the supply of the hydraulic pressure is stopped, the cylinder 12 is naturally retracted because the digging portion 10 drops due to the gravity. Conversely, if the hydraulic pressure supply to the cylinder 12 is "locked" or sustained, the digging portion 10 is fixedly held at a desired height. Further, if the accumulator 137 is connected to the cylinder 12 such that some of the digging portion 10 weight is supported by the pressure from the accumulator 137, the digging portion 10 can be resiliently held.

The hydraulic circuit 138 is connected to the cylinder 12 as the control means 136 that performs switching of hydraulic pressure for adjusting the holding force of the digging portion 10. The hydraulic circuit 138 includes the accumulator 137 for holding some of the digging portion 10 weight by supplying a predetermined level of hydraulic pressure to the cylinder 12. The holding force by the accumulator 137 at which the digging portion 10 is held is set such that it is slightly smaller than the weight of the digging portion 10.

The details of the hydraulic circuit 138 will be described herein below with reference to FIGS. 11–13.

Figure 11:
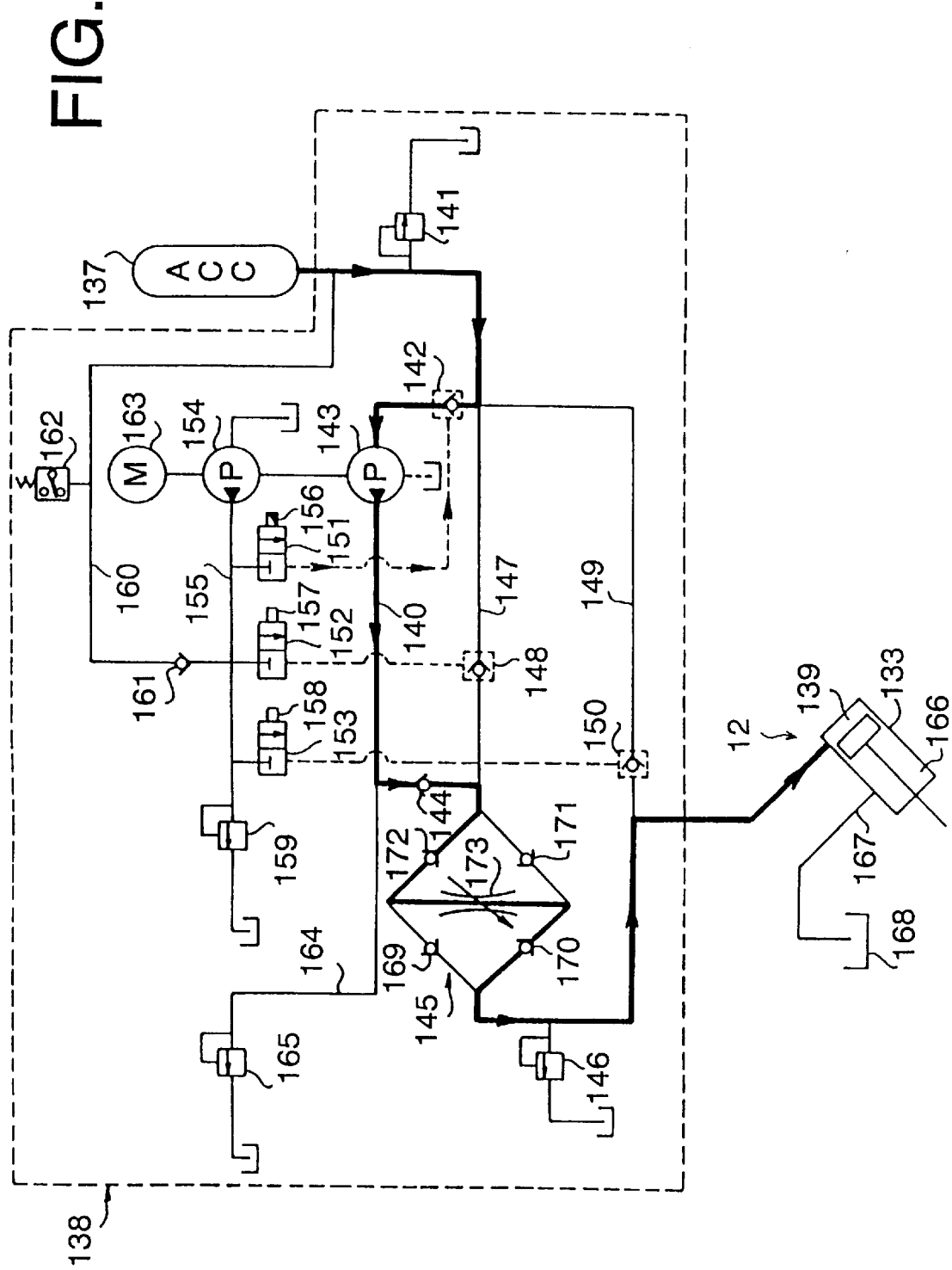
FIG. 11 shows a hydraulic circuit as the control means of FIG. 10 when the digging portion is extended.

As shown in FIG. 11, the accumulator 137 is connected to a head-side chamber 139 of the cylinder 12 by way of a first (distribution) path 140. The pressure by the accumulator 137 is set such that it is slightly but too small to lift up the weight of the digging portion 10 (the front and the lower sprockets 13, 14 and the extensible/retractable frame 15 etc.). For example, the pressure by the accumulator 137 may be set such that it can lift up 8t weight when the digging portion 10 weights 10t.

The first path 140 is provided with a relief valve 141, a first controllable check valve 142, a booster pump 143, a fixed type check valve 144, a check valve unit 145 and a relief valve 146. A second path 147 is provided such that it connects the section between the relief valve 141 and the first controllable check valve 142 with the section between the fixed type check valve 144 and the check valve unit 145. A second controllable check valve 148 is mounted to the second path 147. A third path 149 is provided such that it connects the section between the relief valve 141 and the first controllable check valve 142 with the section between the relief valve 146 and an extensible/retractable cylinder 133. A third controllable check valve 150 is mounted to the third path 149.

The first, second and third controllable check valves 142, 148, 150 are connected to the first, second and third switching valves 151, 152, 153, respectively such that either their "check valve" function of allowing only one-way passage or their "free valve" function of allowing free passage of both directions can be selected by switching of these switching valves 151, 152, 153. Oil as hydraulic fluid is supplied to the first, second and third switching valves 151, 152, 153 from a pump 154 through a fourth path 155, and the oil supply can be switched by solenoids 156, 157, 158. A relief valve 159 is mounted on the fourth path 155.

A fifth path 160 is provided such that it connects the section between the relief valve 159 of the fourth path 155 and the pump 154 with the section between the accumulator 137 of the first path 140 and the relief valve 141. A fixed type check valve 161 and a pressure switch 162 are provided in the fifth path 160. The pressure switch 162 is operated when the pressure inside the accumulator 137 has dropped lower than the preset pressure such that a motor 163 connected to the pump 154 is started and the pressure inside the accumulator 137 is raised to the normal level. It should be noted that the pressure switch 162 does not work in a normal situation because the pressure inside the accumulator 137 is prevented from running off by the check valves and the like.

Further, a sixth path 164 extends from between the pump 143 of the first path 140 and the fixed type check valve 144. A relief valve 165 is provided in the sixth path 164. A rod-side chamber 166 of the cylinder 12 is connected to an oil tank 168 by way of a seventh path 167. The check valve unit 145 includes four fixed type check valves 169, 170, 171, 172 and a variable throttle 173. The hydraulic circuit 138 described above carries out the switching of extension/retraction or fixed/resilient holding of the cylinder 12.

When the cylinder 12 is to extended, as shown in FIG. 11, the solenoid 156 of the first switching valve 151 is energized such that the first controllable check valve 142 is made "free" state and the pump 143 is operated by the motor 163. Then, the oil inside the accumulator 137 is distributed through the first controllable check valve 142, the pump 143, the fixed type check valve 144, the check valve 172, the throttle 173, the check valve 170, and is more pressurized by the pump 143 in the first path 140. The more pressurized oil is introduced into the head-side chamber 139 of the cylinder 12, extending the cylinder 12.

During the operation described above, the pump 143 carries out the pressurizing according to the pressure inside the accumulator 137 because the accumulator 137 is connected to its 143 suction side while the cylinder 12 is connected to its discharge side. Thus, in this case, the amount of work by the pump 143 is reduced by what corresponds to the pressure of the accumulator 137 compared with the case not having the accumulator 137. When the cylinder 12 is extended, the digging portion 10 is raised by way of the link mechanism 11 as shown in FIG. 11. The oil in the rod-side chamber 166 of the cylinder 12 is discharged to the oil tank 168 byway of the seventh path 167.

When the cylinder 12 is to be fixedly held, the pump 143 is stopped. The elevation of the digging portion 10 is then halted and the digging portion 10 is fixedly held at a desired height. This is because herein the hydraulic pressure inside the head-side chamber 139 of the cylinder 12 is sustained by the check valve 169, the throttle 173, the check valve 171, the check valve 144, the second controllable check valve 148, and the third controllable check valve 150 as shown in FIG. 12. It should be noted that the second and the third controllable check valves 144, 150 are performing their non-return function.

Figure 12:
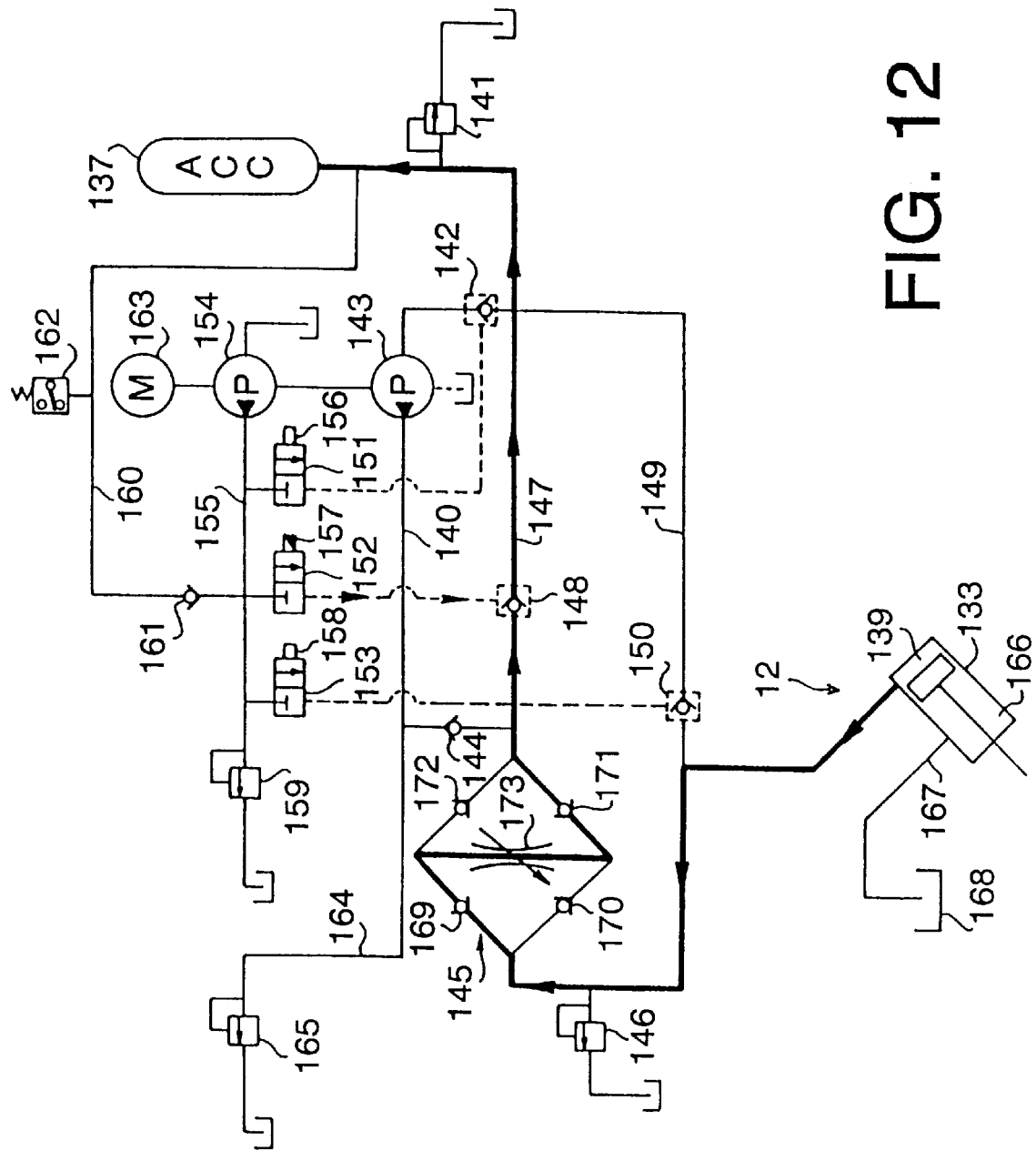
FIG. 12 shows a hydraulic circuit as the control means of FIG. 10 when the digging portion is retracted.

When the cylinder 12 is to be retracted, as shown in FIG. 12, the solenoid 157 of the second switching valve 152 is energized such that the second controllable check valve 148 is made "free" state and the pump 143 is stopped. Then, since the cylinder 12 is retracted being pushed by the weight of the digging portion 10 as shown in FIG. 10, the oil in the head-side chamber 139 of the cylinder 12 is introduced into the accumulator 137 by way of the check valve 169, the throttle 173, the check valve 171, the second controllable check valve 148 (in short, through the second path 147) as shown in FIG. 12. When the cylinder 12 is retracted, the digging portion 10 is lowered as shown in FIG. 10. The rod-side chamber 166 of the cylinder 12 sucks the oil from the oil tank 168 through the seventh path 167. Then, if the second controllable check valve 148 is operated such that its non-return function is performed, the cylinder 12 is fixedly held or freezes at that position as described above.

Figure 13:
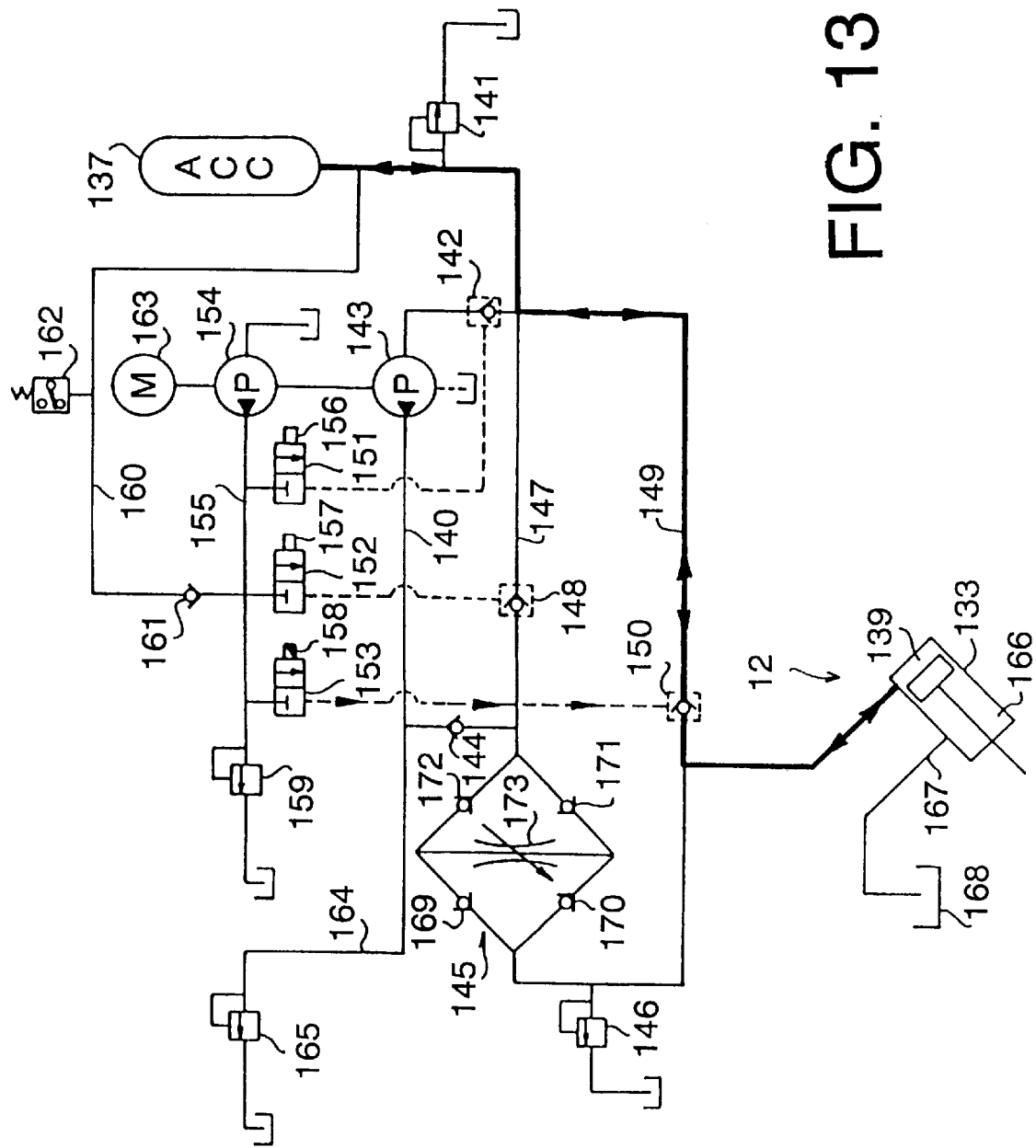
FIG. 13 shows a hydraulic circuit as the control means of FIG. 10 when the digging portion is resiliently held.

When the cylinder 12 is to be resiliently held, as shown in FIG. 13, the solenoid 158 of the third switch valve 153 is energized such that the third controllable check valve 150 is made "free" state. The head-side chamber 139 of the cylinder 12 is then connected with the accumulator 137 by way of the third path 149 and the hydraulic pressure inside the accumulator 137 is applied on the head-side chamber 139. As a result, the digging portion 10 (the front and the lower sprockets 13, 14 and the extensible/retractable frame 15 etc.) is slightly lifted up due to the pressure of the accumulator 137. That is, the pressure that the ship hold floor 36*a* receives from the buckets 9 of the digging portion 10 when the buckets 9 touch the floor 36*a* during cleaning-up of the ship hold 36 becomes small.

For example, if the lifting-up force of the accumulator 137 is set 8t when the digging portion 10 weighs 10t, the touching pressure from the digging portion 10 becomes 2t. Therefore, if the ship hold floor 36*a* is moved up/down or waved due to change in weight balance that is caused by waves or unloading work, the digging portion 10 can flexibly follow such motions while keeping its predetermined touching pressure (2t). As a result, the buckets 9 of the digging portion 10 can be prevented from colliding with the ship hold floor 36a and thus from damaging the buckets 9 and the ship hold floor 36a. It should be noted that the hydraulic pressure is "locked" or sustained as described above such that the cylinder 12 be fixedly held during a normal unloading (a stable digging is carried out with the fixedly held digging portion 10).

The relief valve 141 shown in FIG. 13 may be designed such that its relief pressure is variable and the touching pressure of the digging portion 10 can be adjusted by changing the relief pressure. For example, if the relief pressure of the relief valve 141 is increased, the touching pressure becomes smaller and if the relief pressure of the relief valve 141 is decreased, the touching pressure becomes larger.

Next, another embodiment will be described with reference to FIG. 14 and other drawings.

Figure 14:
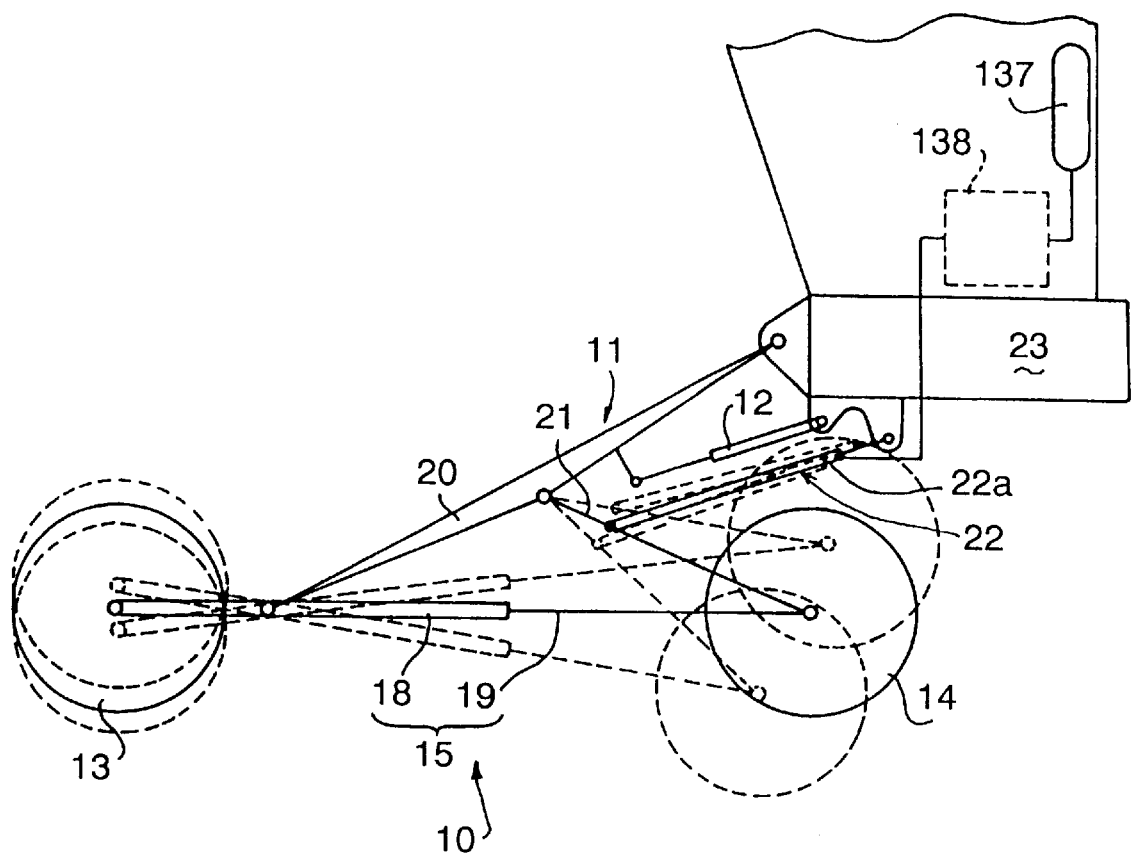
FIG. 14 is a side view showing the tilting movement of the digging portion of FIG. 10.

As shown in FIG. 14, the stay link 22a includes a cylinder that is slidably installed in it (Refer to FIG. 3b(7)) and the tilting angle of the digging portion 10 (the angle of the line linking the front and the lower sprockets 13, 14 against the horizontal line) is changed by extending/retracting the cylinder 22a. The hydraulic circuits 138 is connected to the cylinder 22a as shown in FIGS. 11–13. With this arrangement, the digging portion 10 can flexibly follow the tilting movement of the ship hold floor 36a during cleaning-up of the bulk cargo.

The hydraulic circuit 138 shown in FIGS. 11–13 may be connected to each of the cylinder 22a that controls tilting movement of the digging portion 10 (Refer to FIG. 14) and the cylinder 12 that controls the up/down motion of the digging portion 10 (Refer to FIG. 10) such that the digging portion 10 can simultaneously follow both the up/down and tilting motions of the ship hold floor 36a during the cleaning-up of the ship hold.

By the way, in the continuous unloader shown in FIG. 2, generation of slack in the bucket conveyer 7 due to the gravity between the front and the lower sprockets 23(13), 14 is prevented by engaging guide rollers 9a that are provided on each bucket 9 with a guide rail 18a that is provided at the lower end of the outer cylinder 18 (Refer to FIG. 4).

However, in the continuous unloader of this type, the telescopically extensible/retractable frame 15 that include the outer cylinder 18 and the inner cylinder 19 must be provided between the front and the lower sprockets 13, 14 in order to mount the guide rail 18a. Because of this, the weight of the digging portion 10 increases and the cylinder 12 inevitably becomes large. In addition, this also results in the larger size of counterweight 3b shown in FIG. 1 that is provided for balancing the digging portion 10, further increasing the size and cost of the whole device. Further, the extensible/retractable frame 15 needs periodical maintenance because its sliding part is vulnerable to the entrance of bulk cargo such as coal dust.

Figure 15:
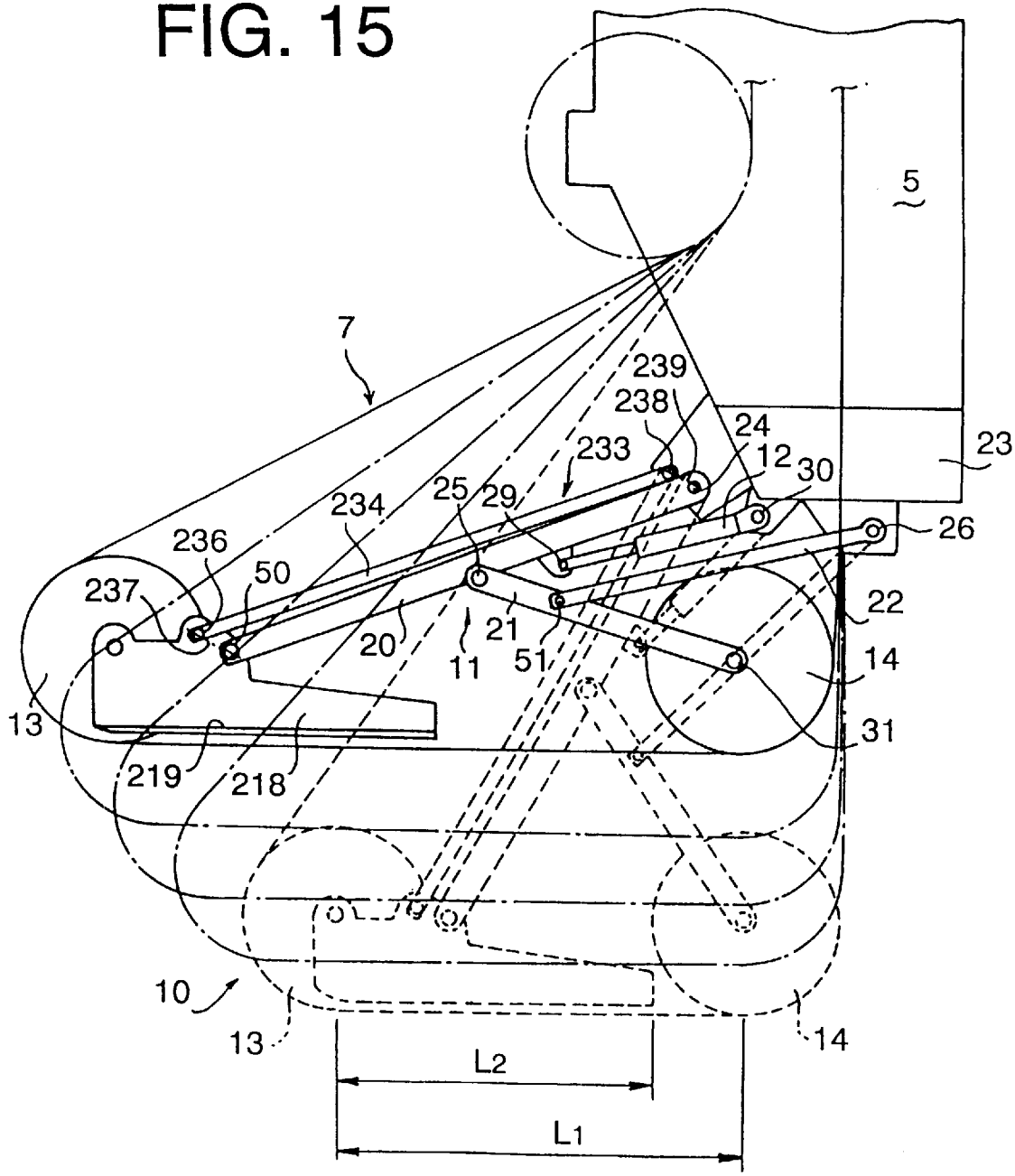
FIG. 15 is an enlarged diagram showing the operational movement of a digging portion of a continuous unloader having a parallel link mechanism.

Therefore, the present invention proposes a continuous unloader shown in FIG. 15 where a front frame 218 is provided at the front sprockets 13f or guiding the travel of the bucket conveyer 7 between the front and the lower sprockets 13, 14 and a parallel link mechanism 233 for elevating/lowering the front frame 218 with maintaining its 218 horizontal position is provided between the front frame 218 and the fixed frame 23. It should be noted that the extensible/retractable frame 15 is no longer needed here. That is, according to this arrangement, the digging portion 10 is required to have only the front frame 219 as the guide member of the bucket conveyer 7 and does not need to have the conventional extensible/retractable frame. This significantly contributes the weight and cost reduction of the device. This type of modified continuous unloader will be described hereinbelow.

Figure 16:
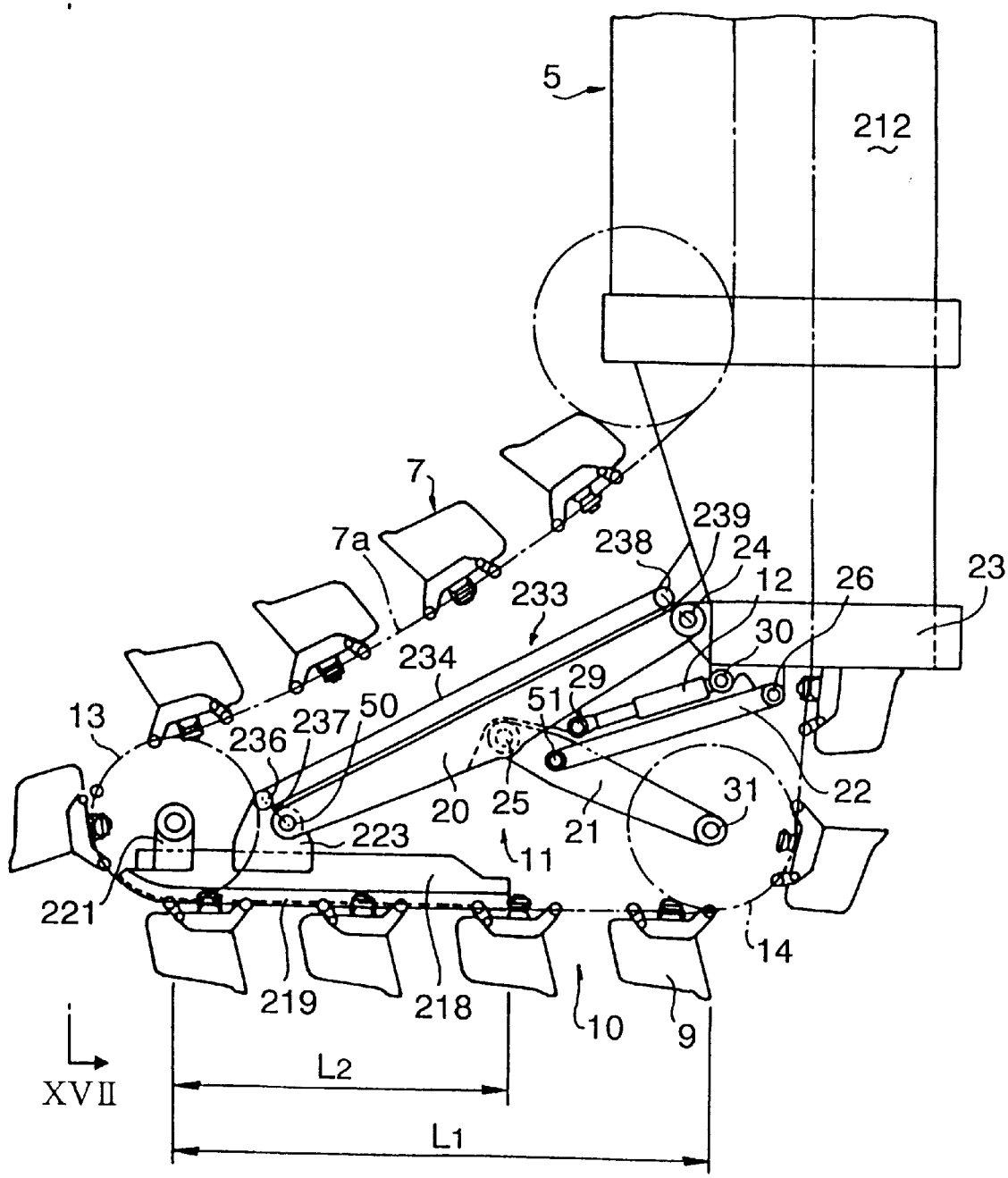
FIG. 16 is an enlarged diagram of the digging portion of FIG. 15.
Figure 17:
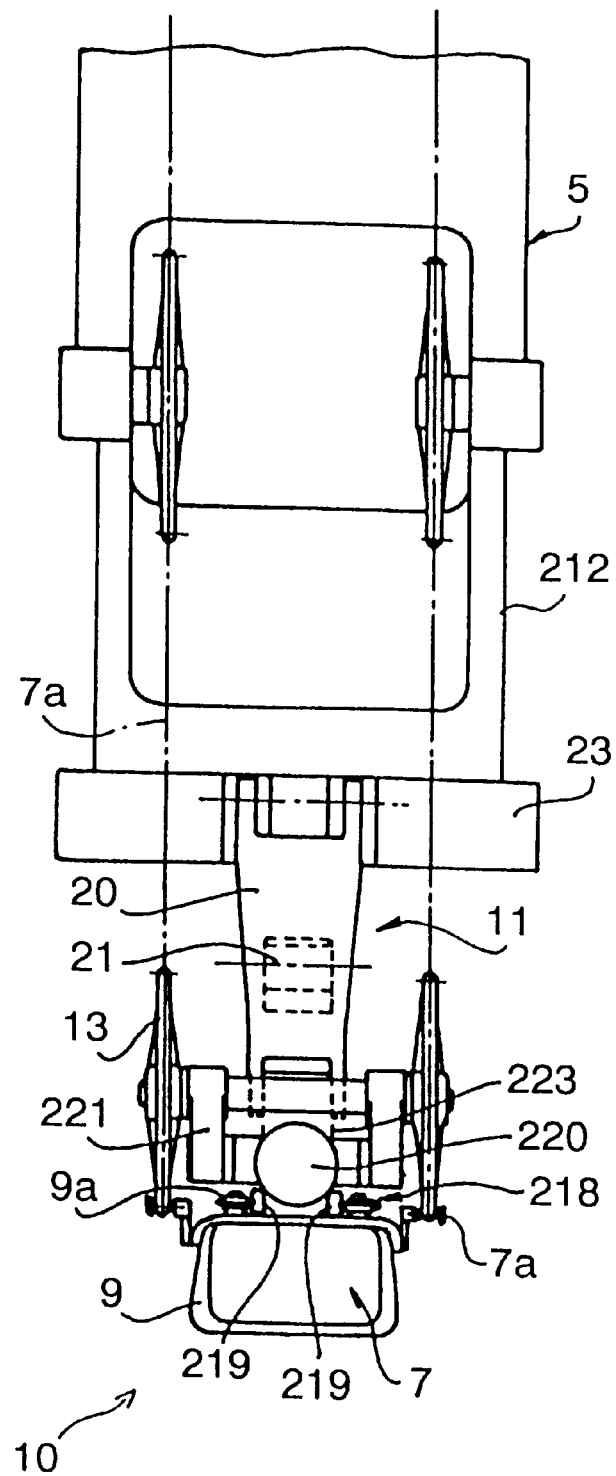
FIG. 17 is a side view from the XXII—XXII line of FIG. 16.

As shown in FIG. 16 and FIG. 17, the front frame 218 is provided at the front sprockets 13 of the digging portion 10 such that it 218 rotationally supports the front sprockets 13 and extends toward the lower sprockets 14. The extension length L2 of the front frame 218 is set to be as long as possible but not interfere with the lower sprockets 14 when the distance L1 between the front and the lower sprockets 13, 14 becomes shortest (as shown in FIG. 15 by broken lines). The reason of this maximum length of L2 is to prevent generation of slack in the bucket conveyer 7 between the sprockets 13, 14 by the guide rail 219 that is provided on the front frame 218.

The front frame 218 includes, as shown in FIG. 17, a rod-shaped main body 220 that extends toward the lower sprockets 14, brackets 221 that rotationally supports the front sprockets 13, brackets 223 for mounting the link mechanism 11, and a guide rail 219 for horizontally guiding the bucket conveyer 7 between the front sprockets 13 and the lower sprockets 14. The guide rail 219 includes a pair of beam material of which section is formed substantially U shaped. The guide rail 219 is engaged with a pair of guide rollers 9a that are provided on the back side of each bucket 9 (each guide roller 9a has a shape that would be obtained by combining two identical corns on their bases) such that slack is not generated in the bucket conveyer 7 between the sprockets 13, 14.

The link mechanism 11 is provided between the front fame 218, the lower sprockets 14 and the fixed frame 23 as shown in FIG. 15 such that it 11 elevates the front and the lower sprockets 13, 14 while the distance L1 line between these sprockets 13, 14 is widened but kept horizontal and it 11 lowers these sprockets 13, 14 while the distance L1 line between the sprockets 13, 14 is narrowed but kept horizontal. The link mechanism 11 includes, as shown in FIG. 16, a main link 20 of which one end is connected to the fixed frame 23 by the connection point 24 and of which the other end is connected to the front frame 218 by the connection point 50, an assistant link 21 of which one end is connected to the midpoint of the main link 20 by the connection point 25 and of which the other end is directly connected to the lower sprockets 14 by the connection point 31, and a stay link 22 of which one end is connected to the midpoint of the assistant link 21 by the connection point 51 and of which the other end is connected to the fixed frame 23 by the connection point 26.

The connection point 26 of the stay link 22 on the fixed frame 23 side is a predetermined distance separated from the mounting point 24 of the main link 20 on the fixed frame 23 side. The connection point 31 of the assistant link 21 directly and rotationally supports the lower sprockets 14. The connection point 50 of the main link 20 is connected to the front frame 218 by way of the brackets 223. A cylinder 12 for operating the link mechanism 11 is provided between the main link 20 and the fixed frame 23. The cylinder 12 is arranged such that its connection point 30 on the fixed frame 23 side is located between the connection point 24 and the connection point 26 and the connection point 29 on the main link 20 side is located between the connection point 25 and the connection point 24.

The parallel link mechanism 233 is provided between the front frame 218 and the fixed frame 23 for elevating the front frame 218 without tilting the front frame 218 from its horizontal position. The parallel link mechanism 233 includes the main link 20, a long link 234 which is arranged in parallel with the main link 20 and of which one end is connected to the fixed frame 23 by the connection point 238 and of which the other end is connected to the brackets 223 of the front frame 218 by the connection point 236, a virtual link 237 that is virtually formed between the connection point 236 on the front frame 218 side and the connection point 50, and a virtual link 239 that is virtually formed between the connection point 238 on the fixed frame 23 side and the connection point 24. The virtual link 237 and the virtual link 239 are arranged to be parallel with each other.

The operation of the present embodiment will be described hereinbelow.

When the cylinder 12 is retracted from its extended state (shown in FIG. 15 in continuous lines) to its retracted state, the link mechanism 11 is operated as shown in the broken lines such that the lower sprockets 14 and the front sprockets 13 are both lowered while the distance L1 line between them is narrowed but kept horizontal. The slack that is generated in the chains 7a of the bucket conveyer 7 due to narrowing the distance between the front and the lower sprockets 13, 14 is absorbed or canceled out by the widened distance between the sprockets 13, 14 and the upper sprockets 8 (Refer to FIG. 1a) that results from the lowering of the sprockets 13, 14. If the cylinder 12 is extended from that state, the link mechanism 11 is operated in the reverse way and the front and the lower sprockets 13, 14 are elevated while the distance L1 line between them is widened but kept horizontal, returning to their original position.

When the digging portion 10 is elevated as described above, the front frame 218 is elevated without tilting from its horizontal line because it 218 is connected to the fixed frame 23 by way of the parallel link mechanism 233. Thus, the guide rail 219 that is provided on the front frame 218 is also elevated up/lowered down without tilting and the guide rollers 9a of each bucket 9 of the bucket conveyer 7 is always horizontally guided between the front and the lower sprockets 13, 14 being engaged with the guide rail 219. Herein, if the long link 234 that is one of the components of the parallel link mechanism 233 were not provided, the front sprocket 13 would be rotated downward about the connection point 50 of the main link 20. That is, the long link 234 pullingly withholds the front sprockets 13.

As described above, the digging portion 10 is required to have only the front frame 218 that is provided with the guide rail 219 and does not need to have the extensible/retractable frame 15 that includes the outer cylinder 18 and the inner cylinder 19 (Refer to FIG. 2). Since the front frame 218 can be made from steel plates and less heavy than the conventional frame 15 (it 218 needs to have only one function of horizontally guiding the bucket conveyer 7 between the sprockets 13, 14), the weight of the digging portion 10 can be significantly reduced. As a result, the counter weight 3b shown in FIG. 1 for balancing the digging portion 10 can be made smaller, achieving both size and cost reduction of the whole device. Further, the periodical maintenance that the extensible/retractable frame 15 (Refer to FIG. 2) would need for removing bulk cargo such as coal dust from its sliding part is no longer required.

Figure 18:
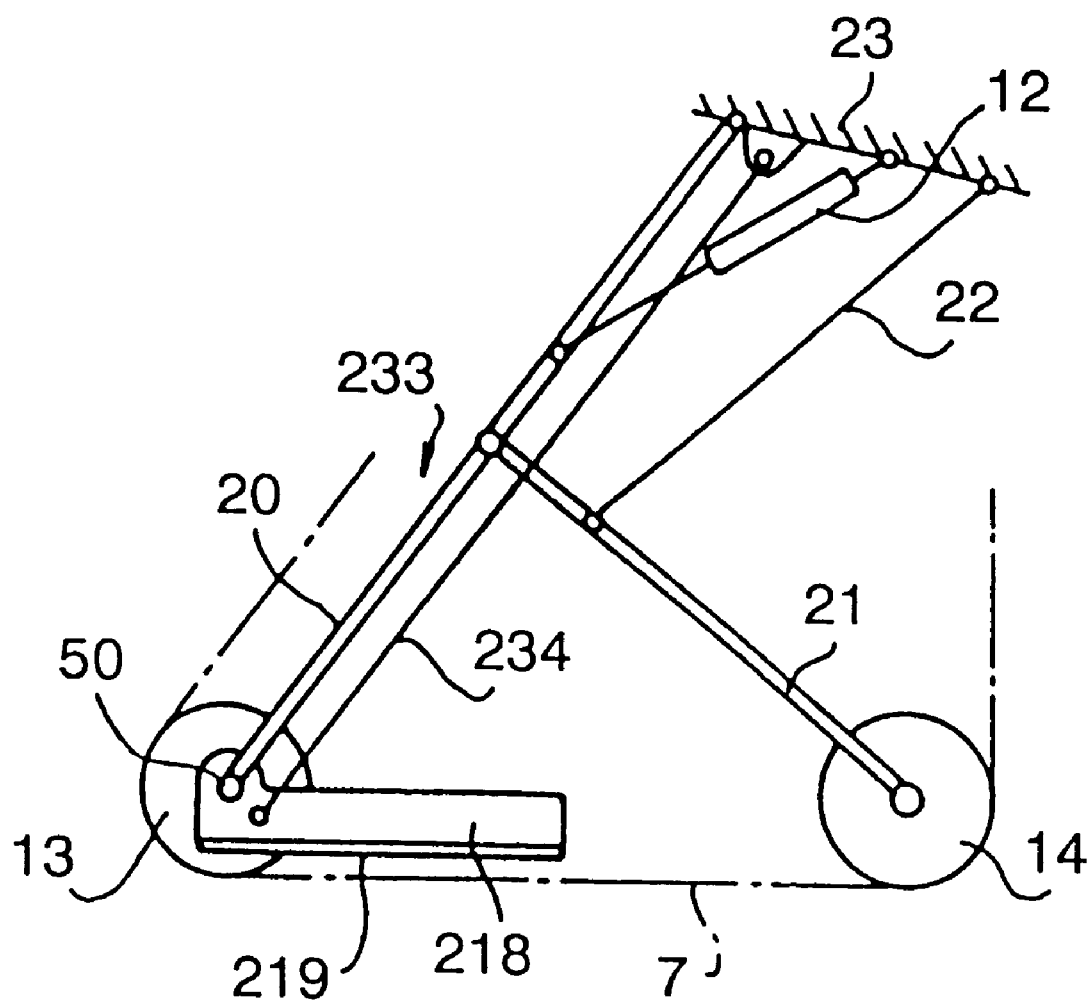
FIG. 18 is a schematic diagram of a part of a continuous unloader according to another embodiment having another type of parallel link mechanism.

Next, yet another (third) embodiment will be described hereinbelow with reference to FIG. 18.

As shown, the front sprockets 13 are directly connected to the connection point 50 at the lower end of the main link 20. In this case, the long link 234 that is one of the components of the parallel link mechanism 233 is provided below the main link 20 in parallel with it 20.

By the way, in the continuous unloader 1 that employs the link mechanism 11 shown in FIGS. 1–6, the link mechanism 11 is operated such that the distance between the front and the lower sprockets 13, 14 is adjusted and the sprockets 13, 14 associatedly make the up/down motion. During this operation, it is physically impossible to keep the peripheral length of the chains 7a of the bucket conveyer 7 absolutely constant and thus generation of some tense or slack in the chains 7(7a) is unavoidable. In addition, the chain 7(7a) may slack if the pitch between each chain is widened due to the worn out bush of the chain 7 (7a) after use for a long period. Such slacked chains 7(7a) are not desirable because they may run off the sprockets 13, 14.

Figure 19:
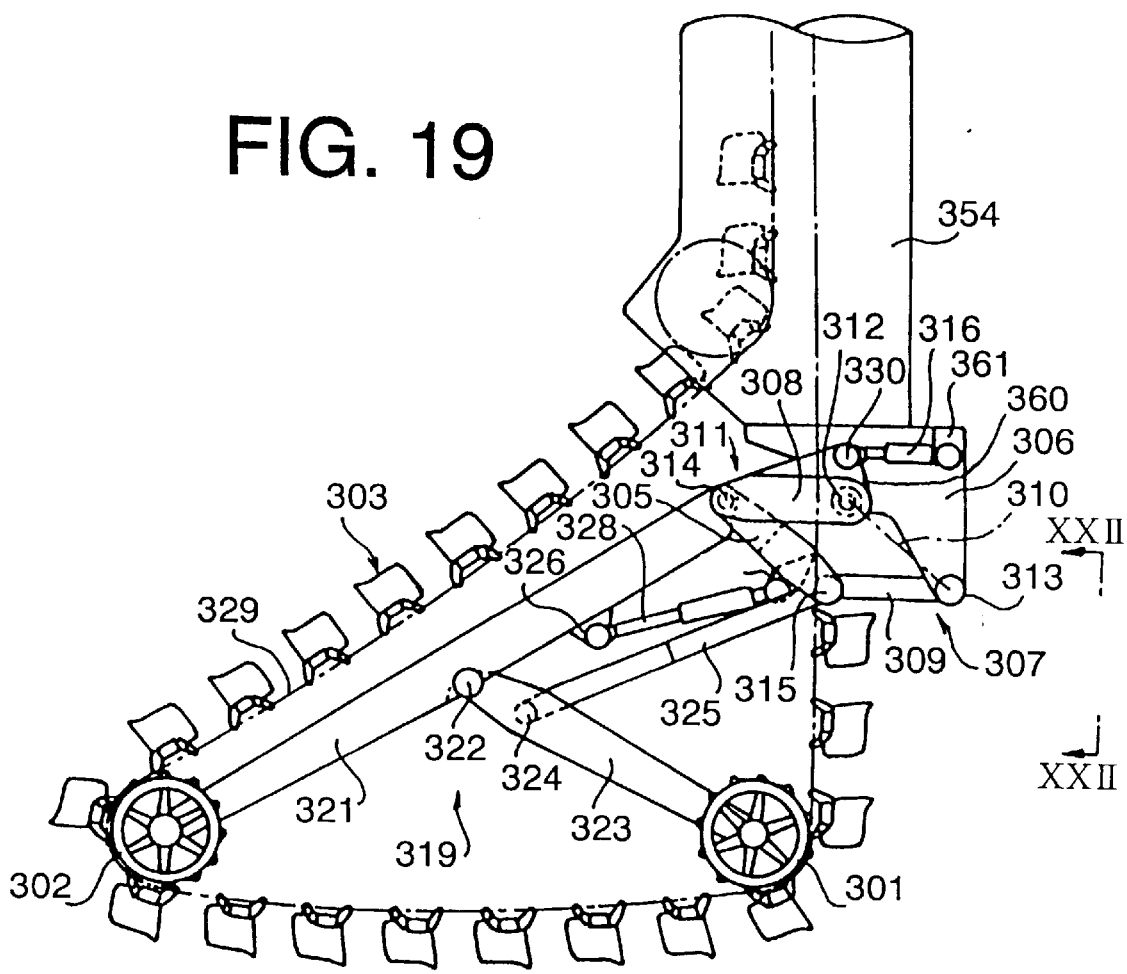
FIG. 19 is an enlarged diagram of a digging portion of the continuous unloader of FIG. 18 that has lift means for making up/down motion of the link mechanism with the base part.

Therefore, the present invention proposes a continuous unloader of another type shown in FIG. 19 as yet another embodiment so that the chains 7 (7a) can avoid having slack or tense. In the continuous unloader of this type, the distance between sprockets 302, 301 and upper sprockets 350 (Refer to FIG. 26) is adjusted by elevating/lowering the base part 305 that supports the link mechanism 319 by way of an elevation/lowering mechanism 307 such that slack or tense in the chains 329 (7a) is absorbed or canceled out.

The embodiment of the continuous unloader of this type will be described hereinbelow.

Figure 26:
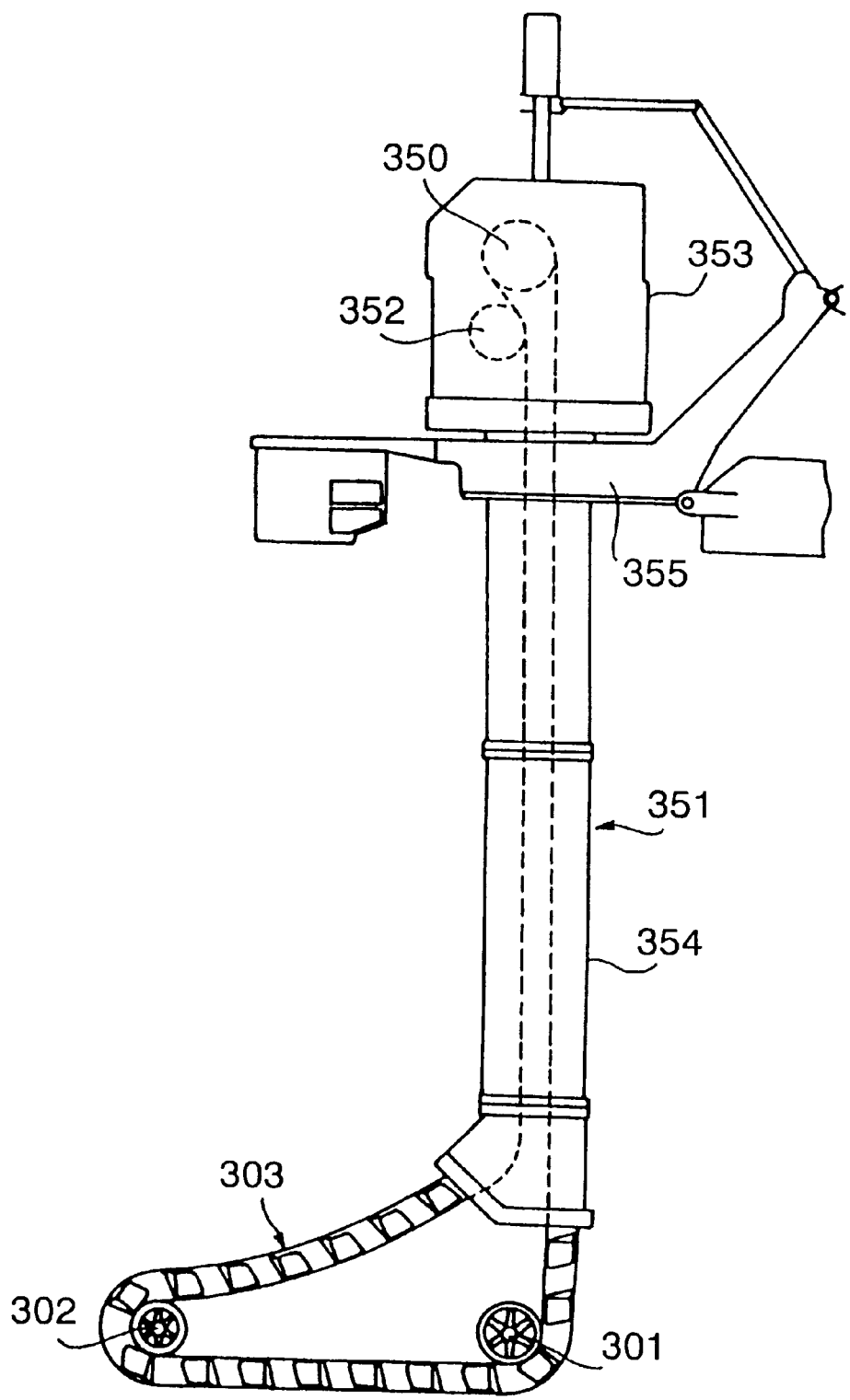
FIG. 26 is a schematic side view of the continuous un loader of FIG. 19.
Figure 27:
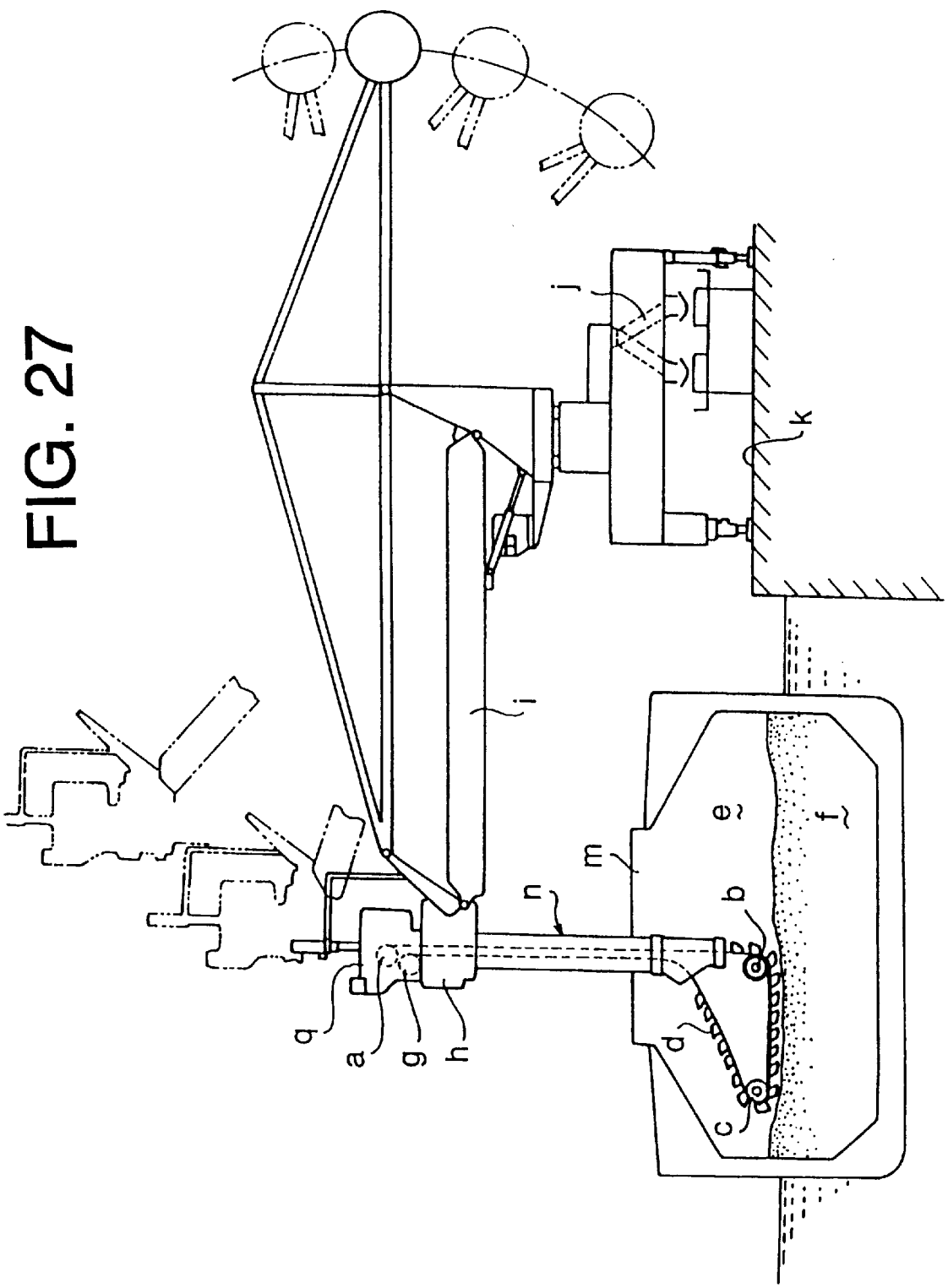
FIG. 27 is an explanatory diagram showing the whole structure of conventional continuous unloader.

As shown in FIG. 26, the continuous unloader according to the present embodiment generally includes upper sprockets 350, lower sprockets 301 that are provided below the upper sprockets 350, front sprockets 302 that are provided in front of the lower sprockets 301, and endless bucket conveyers 303 that are engagedly taken on the upper, lower and front sprockets 350, 301, 302 (This arrangement is basically the same as that shown in FIG. 1). The upper sprockets 350 are supported by a frame 351. The frame 351 includes an upper cover 353 for covering the upper sprockets 350 and reverse sprockets 352, and an elevator casing 354 for covering the vertical part of the bucket conveyer 303. The frame 351 is mounted on a top support frame 355.

As shown in FIG. 19, a fixed part 306 for suspending the base part 305 is provided at the lower end of the elevator casing 354. The base part 305 for supporting the front and lower sprockets 302, 301 is connected to the fixed part 306 by way of the elevation/lowering mechanism 307 such that it 305 can be elevated/lowered. The elevation/lowering mechanism 307 has a parallel link mechanism 311 that includes upper holding links 308, lower holding links 309, base links 305 and virtual links 310.

More specifically, each upper holding link 308 is at one end connected to the fixed part 306 by a pin 312 and each lower holding link 309 is at one end connected to the fixed part 306 by a pin 313. Each other end of the upper and lower holding links 308, 309 are connected to the base part 305 by a pin 314, 315 respectively. Each virtual link 310 links the pin 312 and the pin 313. In addition, the upper holding link 308 is arranged in parallel with the lower holding link 309 and the base part 305 is arranged in parallel with the virtual link 310.

Figure 23:
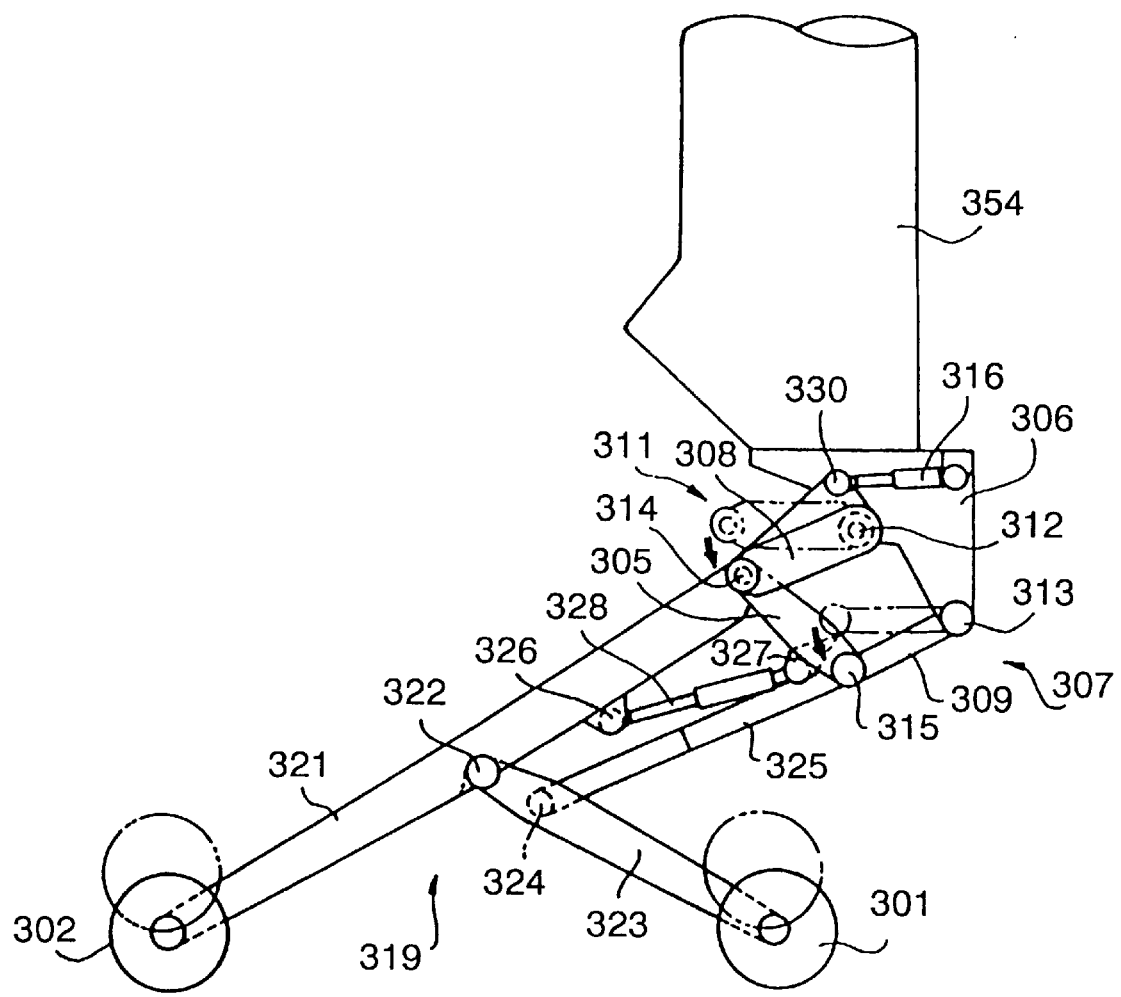
FIG. 23 is a side view showing the operational movement of the continuous unloader shown in FIG. 19.

According to the arrangement above, by hydraulically or electrically extending/retracting a holding cylinder 316 that is provided between brackets 360 formed at the upper holding link 308 and brackets 361 formed in the fixed part 306, the upper holding link 308 and the lower holding link 309 are each rotated about the pin 312 and the pin 313, respectively as shown in FIG. 23 such that the parallel link mechanism 311 is operated for elevation/lowering of the base part 305.

Figure 20:
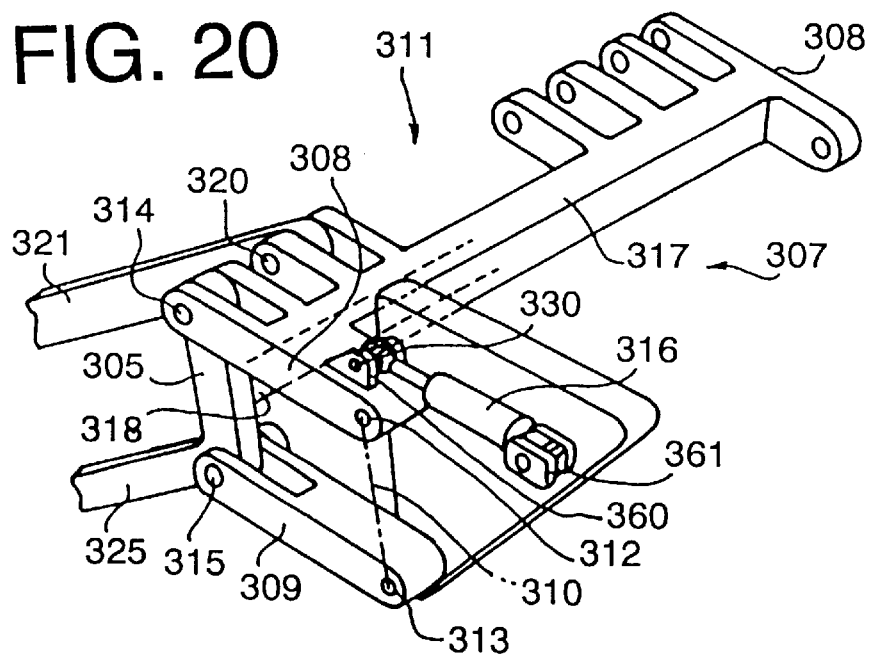
FIG. 20 is an enlarged diagram of a part shown in FIG. 19.
Figure 22:
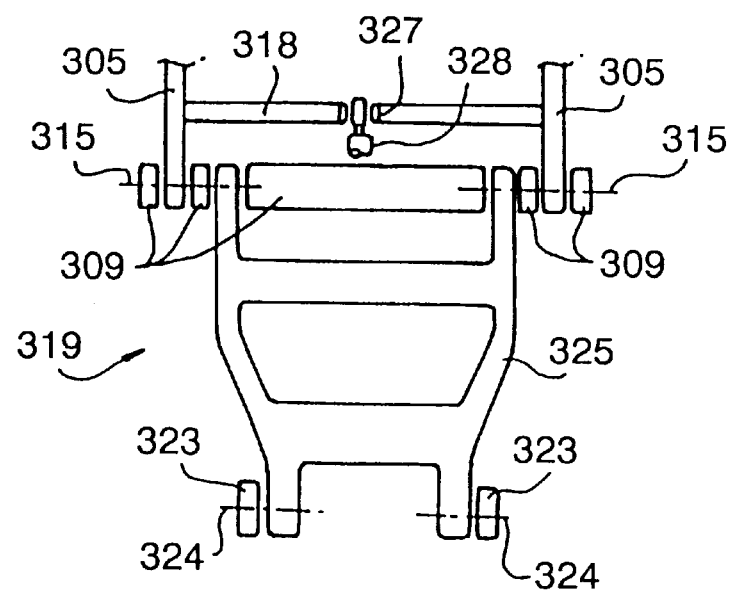
FIG. 22 is a view from XXII—XXII line of FIG. 19.

The pair of upper holding links 308 is provided on left and right sides of the bucket conveyer 303 as shown in FIG. 20 such the pair sandwiches the bucket conveyer 303. Also, the pair of lower holding links 309 is provided on left and right sides of the bucket conveyer 303 as shown in FIG. 20 such the pair sandwiches the bucket conveyer 303. The paired upper holding link 308, 308 are connected with each other by a connection member 317. Similarly, the paired base parts 305, 305 are provided on the left and right sides of the bucket conveyer 303, respectively. They 305, 305 are connected by a connection member 318 (Refer to FIG. 22).

According to the arrangement above, the connection member 317 and the connection member 318 drive the paired upper holding links 308, 308, lower holding links 309, 309 and base parts 305, 305. Therefore, providing the holding cylinder 316 on only one side (either left or right) is enough in terms of functionality. However, the holding cylinder 316 may be provided on both sides such that the load can be equally shared by both sides.

Figure 21:
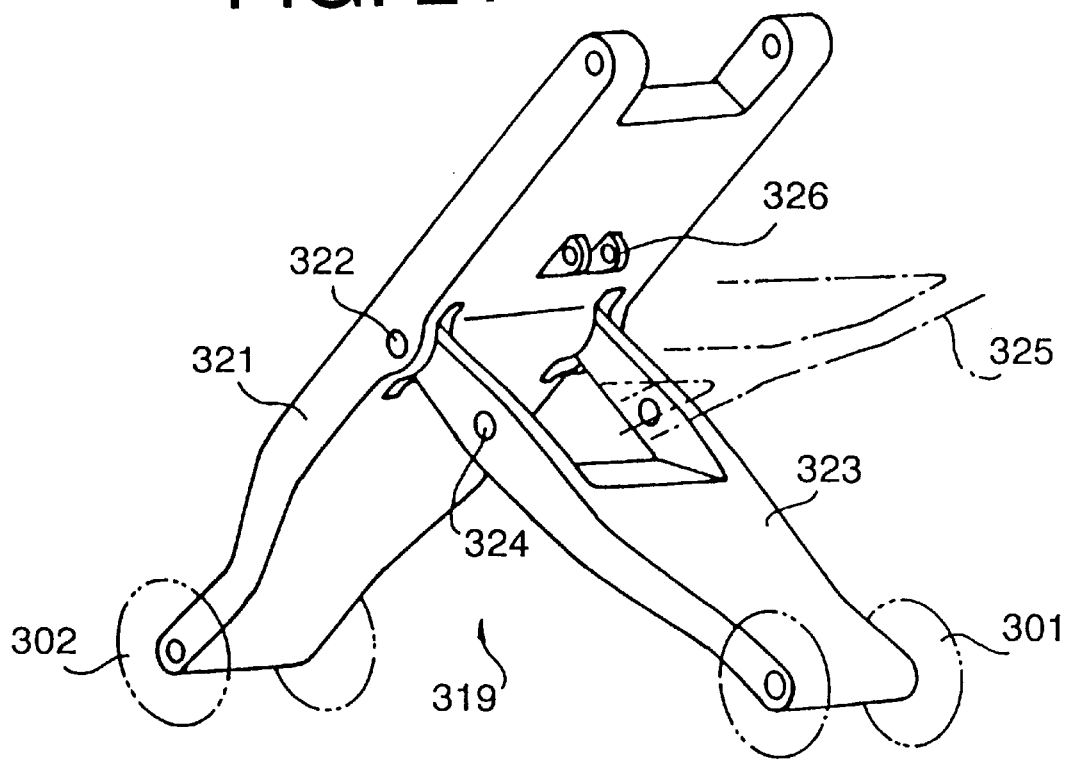
FIG. 21 is a perspective view of a part shown in FIG. 19.

Another link mechanism 319 is connected to the base part 305 that is elevated/lowered by the parallel link mechanism 311 such that the front and the lower sprockets 302, 301 are lowered when the distance between them is narrowed and these sprockets 302, 301 are elevated when the distance between them is widened (Refer to FIG. 21). As shown in FIGS. 19–22, the link mechanism 319 includes a main link 321 of which one end is connected to the upper holding link 308 by the connection point 320 and of which the other end is rotationally connected to the front sprockets 302, an assistant link 323 of which one end is connected to the midpoint of the main link 321 by a pin 322 and of which the other end is rotationally connected the lower sprockets 301, and a stay link 325 of which one end is connected to an midpoint of the assistant link 323 by a pin 324 and of which the other end is connected to the lower holding link 309 by a pin 315.

As shown in FIG. 20, the pin 320 of the main link 321 is arranged coaxial with the pin 314 of the base part 305. Thus, the main link 321 is "virtually" pin-connected with the base part 305. Similarly, the pin 315 of the stay link 325 is arranged coaxial with the pin 315 of the base part 305. Thus, the stay link 325 is "virtually" pin-connected with the base part 305. It should be noted that the main link 321 and the stay link 325 may be directly connected to the base part 305 by pins. In short, any arrangement can be employed as long as the main link 321 and the stay link 325 are elevated/lowered together with the elevation/lowering of the base part 305.

The link mechanism 319 is operated by a hydraulically or electrically extensible/retractable cylinder 328 that is provided between brackets 326 formed in the main link 321 and the brackets 327 formed in the connection member 318 of the base part 305 as shown in FIG. 19. When the extensible/retractable cylinder 328 is extended, the main link 321 is upwardly rotated about the pin 314, the assistant link 323 is upwardly rotated about the pin 322 and the stay link 325 is upwardly rotated about the pin 315 such that the front and the lower sprockets 302, 301 are raised while the distance line between the sprockets 302, 301 is widened but kept horizontal as shown in FIG. 19. Conversely, when the extensible/retractable cylinder 328 is retracted, the front and the lower sprockets 302, 301 are lowered while the distance line between the sprockets 302, 301 is narrowed but kept horizontal as shown in FIG. 24.

The lever ratio of each link of the link mechanism 319 is set such that the peripheral length of the chains 329 of the bucket conveyer 303 be maintained substantially constant. More specifically, the shortage of chain 329 length caused by the widened distance between the front and the lower sprockets 302, 301 is canceled out by raising these sprockets 302, 301 and narrowing the distance between the sprockets 302, 301 and the upper sprockets 350 (Refer to FIG. 26). On the other hand, the slack of chain 329 length caused by the shortened distance between the front and the lower sprockets 302, 301 is canceled out by lowering these sprockets 302, 301 and increasing the distance between the sprockets 302, 301 and the upper sprockets 350.

Next, the operation of the present embodiment will be described below.

Figure 24:
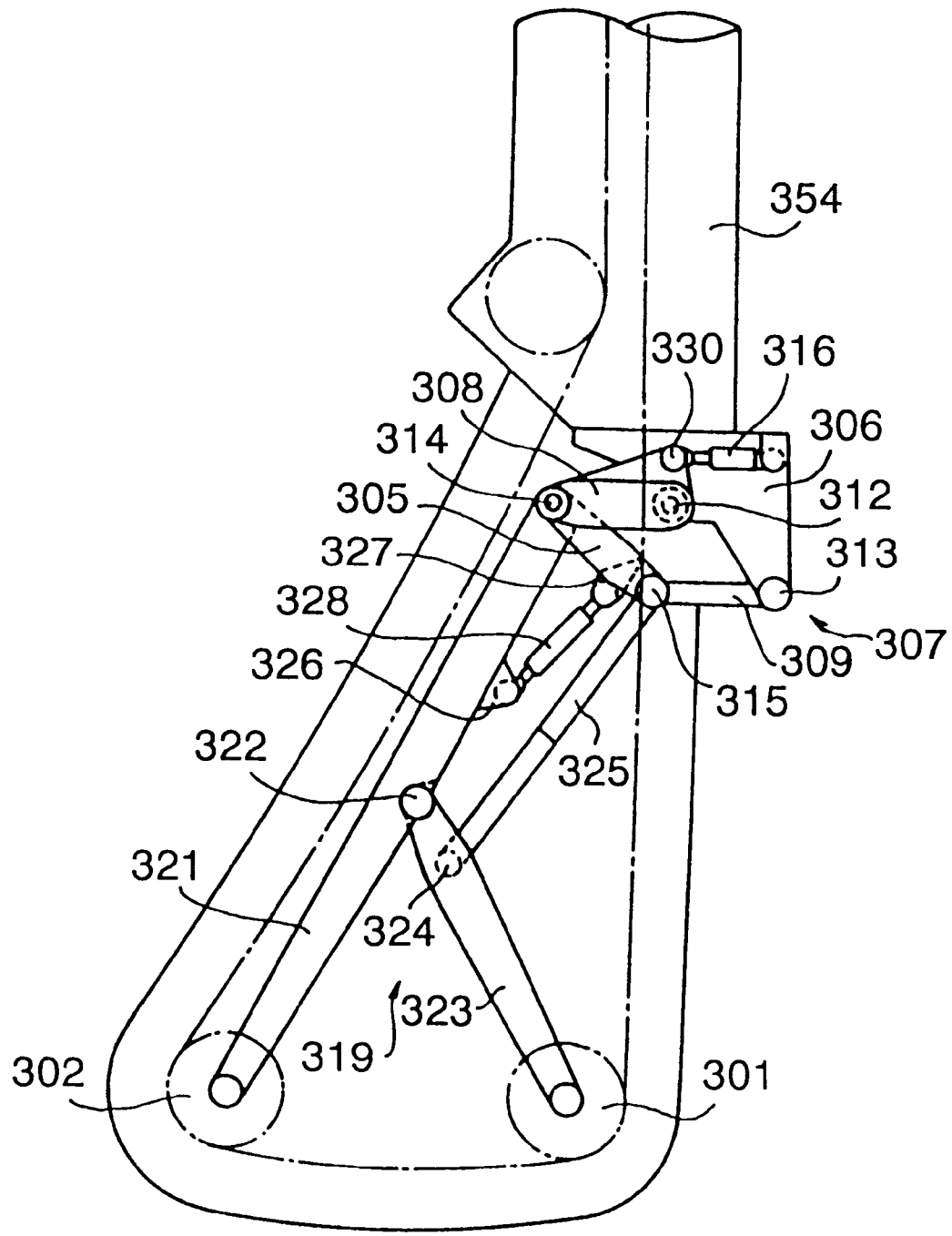
FIG. 24 is a side view showing a state in which the digging portion of FIG. 19 is retracted.

When the distance between the front and the lower sprockets 302, 301 (that is, the length of the digging portion 10) is to be adjusted, the adjustment is carried out by extending/retracting the extensible/retractable cylinder 328 and operating the link mechanism 319 as shown in FIGS. 19 and 24.

During the operation described above, as the distance between the front and the lower sprockets 302, 301 is narrowed when these sprockets 302, 301 are lowered while the distance is widened when these sprockets 302, 301 are elevated, the peripheral length of the chains 329 of the bucket conveyer 303 can be kept substantially constant. However, it is physically impossible to keep the peripheral chain length absolutely constant. Thus, some slack or tense may be generated in the chains 329. In addition, the chains 329 inevitably slacks after being used for a long period.

In order to prevent the occurrence of slack in the chains 329, the base part 305 is lowered by extending the holding cylinder 316 as shown in FIG. 23. When the base part 305 is lowered, the link mechanism 319 is lowered as a whole while the position or structural relationship of each link is maintained, and the distance between the sprockets 302, 301 and the upper sprockets 350 is widened (Refer to FIG. 26) such that slack in the chains 329 is absorbed or canceled out.

Herein, as the link mechanism 319 as a whole is lowered by lowering the base part 305, the front sprockets 302 and the lower sprockets 301 are each lowered by the downward stroke of the base part 305. Thus, slack in the chains 329 that is substantially twice as long as the downward stroke of the base part 305 can be absorbed or canceled out. As a result, the downward stroke of the base part 305 for absorbing or canceling out the slack (excessive portion) in the chains 329 can be made relatively short.

Further, due to the lever ratio that is determined based on the distance between the pin 330 of the holding cylinder 316 and the pin 312 of the upper holding link 308 and on the distance between the pin 312 of the upper holding link 308 and the pin 320 (or the pin 314) of the main link 321 (Refer to FIGS. 19 and 20), the base part 305 can be lowered to a large degree even if the extension stroke of the holding cylinder 316 is relatively small as shown in FIG. 23. As a result, the holding cylinder 31 can be of a relatively small size. It should be noted that the extensible/retractable cylinder 328 and the holding cylinder 316 are both made in the hydraulically "blocked" state during the normal digging operation. Further, tense generated in the chains 329 can be absorbed or canceled out by elevating the base part 305.

By the way, in the arrangement described above, the link mechanism 319 in which the front and the lower sprockets 302, 301 are mounted is as a whole "floatingly" supported from the fixed part 306 by way of the parallel link mechanism 311 and the holding cylinder 316. Therefore, the holding cylinder 316 receives the tense force of the chains 329 of the bucket conveyer 303. However, the tense force of the chain 329 can be controlled such that slack or tense in the chain 329 be automatically absorbed or canceled out by providing an accumulator that keeps the hydraulic pressure supplied to the holding cylinder 316 constant (the accumulator is to be provided between the holding cylinder 316 and the hydraulic pressure source).

The longer the extension stroke of the holding cylinder 316 becomes, the larger the slack of the chains 329 are regarded to have become. Therefore, it is possible to know if the slack of the chains 329 has reached its maximum limit or not based on the extension stroke of the holding cylinder 316 (more precisely, depending on whether the extension stroke of the holding cylinder 316 has reached a predetermined value or not). In this case, the extension stroke may be automatically detected by a stroke sensor that is provided at the holding cylinder 316 or may be detected by a worker himself/herself with reference to a scale that is provided in the rod part of the holding cylinder 316.

Figure 25:
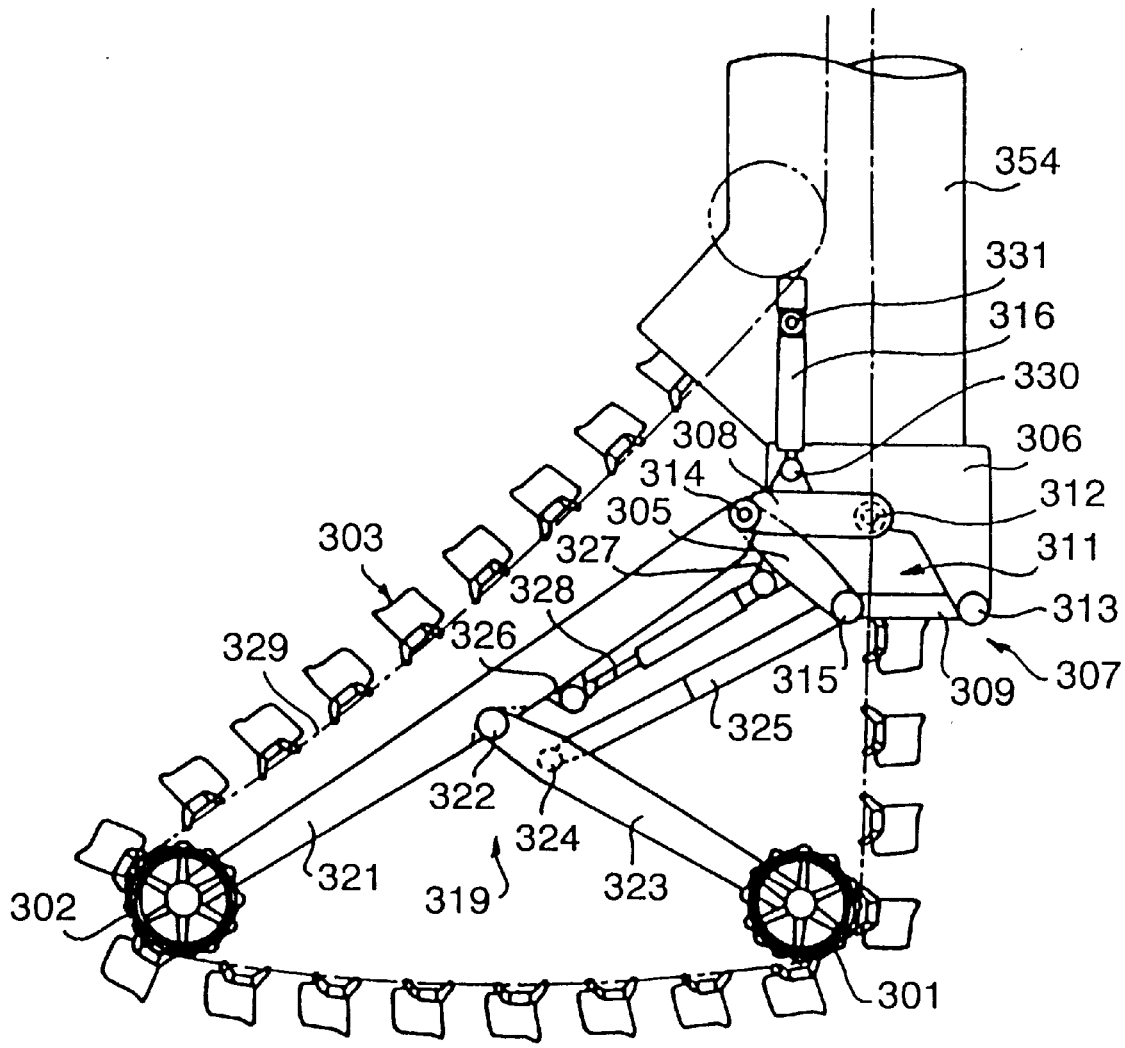
FIG. 25 is a side view showing a modification (another embodiment) of the continuous unloader of FIG. 19.

Next, yet another (the fourth) embodiment will be described with reference to FIG. 25.

As shown in the drawing, the continuous unloader of the present embodiment has basically the same structure as the previous one except for the holding cylinder 316 that is vertically arranged. The holding cylinder 316 is connected at one end to the upper holding link 38 by the pin 330 and at the other end to the elevator casing 354 by the pin 331. It should be noted that the functions and effects achieved according to this embodiment are similar to those according to the previous embodiment.

As a summary, the present invention can be preferably employed in a continuous unloader for unloading bulk cargo such as coals or iron ore from a ship and the like.

What is claimed is:

1. A continuous unloader comprising:
    upper sprockets;
    lower sprockets that are located below the upper sprockets;
    front sprockets that are located in front of the lower sprockets;
    an endless bucket conveyer that is engagedly taken on the upper, the lower and the front sprockets; and
    a link mechanism that is provided at the lower end of a support frame that supports the upper sprockets, such that the link mechanism lowers the lower sprockets and the front sprockets when the distance between the lower and front sprockets is narrowed and it raises the lower sprockets and the front sprockets when the distance between the lower and front sprockets is widened,
    wherein the lower sprockets and the front sprockets are connected to the lower end of the support frame by way of the link mechanism, and the link mechanism includes a main link of which one end is connected to the lower end of the support frame and of which the other end is connected to the front sprockets, an assistant link of which one end is connected to the midpoint of the main link and of which the other end is connected to the lower sprockets, a stay link of which one end is connected to the midpoint of the assistant link and of which the other end is connected to the lower end of the support frame.

2. The continuous unloader of claim 1, further including an actuator connected to the link mechanism for changing a position of the link mechanism and retaining the changed position of the link mechanism.

3. The continuous unloader of claim 2, wherein the actuator includes a cylinder, and one end of the cylinder is connected to the lower end of the support frame to which the link mechanism is connected and the other end is connected to one of the links that are the components of the link mechanism.

4. The continuous unloader of claim 1, wherein a cylinder for extending/retracting the whole length of the stay link is installed in each stay link.

5. The continuous unloader of claim 1, wherein a front frame is provided at the front sprockets for guiding the travel of the bucket conveyer between the front sprockets and the lower sprockets, and a parallel link mechanism is provided between the front frame and the lower end of the support frame such that the front frame is elevated/lowered by the parallel mechanism without tilting from its horizontal position.

6. A continuous unloader comprising:
    upper sprockets;
    lower sprockets that are located below the upper sprockets;
    front sprockets that are located in front of the lower sprockets;
    an endless bucket conveyer that is engagedly taken on the upper, the lower and the front sprockets;
    an extensible/retractable frame that is provided between the front sprockets and the lower sprockets such that it supports these sprockets and the distance between the front sprockets and the lower sprockets is adjusted by its extension/retraction; and
    a link mechanism that is provided between the extensible/retractable frame and the lower end of a support frame that supports the upper sprockets, such that the link mechanism lowers the extensible/retractable frame when the frame is retracted and the link mechanism raises the extensible/retractable frame when the frame is extended,
    wherein the link mechanism includes a main link of which one end is connected to the lower end of the support frame and of which the other end is connected to the front sprockets side of the extensible/retractable frame, an assistant link of which one end is connected to the midpoint of the main link and of which the other end is connected to the lower sprockets side of the extensible/retractable frame, a stay link of which one end is connected to the midpoint of the assistant link and of which the other end is connected to the lower end of the support frame, and a cylinder for extending/retracting the whole length of the stay link is installed in the stay link, and another cylinder is provided between the lower end of the support frame and one of the links constituting the link mechanism such that the link mechanism can change its position and retain the changed position by the another cylinder.

7. The continuous unloader of claim 6, wherein one end of the another cylinder is connected to the lower end of the support frame and the other end is connected to the main link of the link mechanism.

8. The continuous unloader of claim 6, wherein control means for controlling a holding force of the link mechanism by the another cylinder is connected to the another cylinder.

9. The continuous unloader of claim 8, wherein the control means includes a hydraulic circuit for controlling hydraulic pressure that is supplied to the another cylinder.

10. The continuous unloader of claim 9, wherein the hydraulic circuit includes an accumulator for holding the weight of the link mechanism, the front and the lower sprockets, and a portion of the bucket conveyer that is taken on between the front and the lower sprockets.

11. The continuous unloader of claim 10, wherein the holding force by the accumulator is set such that it is slightly smaller than the weight of the link mechanism, the front and the lower sprockets and a portion of bucket conveyer that is taken on between the front and the lower sprockets.

12. A continuous unloader comprising:

upper sprockets;

lower sprockets located below the upper sprockets;

front sprockets located in front of the lower sprockets;

an endless bucket conveyer operatively taken on the upper, lower and front sprockets;

a support frame for supporting the upper sprockets;

an elevation/lowering mechanism provided at a lower end of the support frame;

a base part operatively connected to the lower end of the support frame by way of the elevation/lowering mechanism such that the base part is raised and lowered by the elevation/lowering mechanism relative to the support frame; and a link mechanism connected to the front and lower sprockets and to the base part such that the front and lower sprockets are lowered relative to the base part when the distance between the front and lower sprockets is narrowed and the front and lower sprockets are raised relative to the base part when the distance between the front and lower sprockets is widened, the connection of the link mechanism to the base part allowing the link mechanism to be raised and lowered together with the base part relative to the support frame upon actuation of the elevation/lowering mechanism without changing the positional relationship of the links making up the link mechanism.

13. The continuous unloader of claim 12, wherein the elevation/lowering mechanism includes a parallel link mechanism that has: upper holding links of which one end is connected to the base part and of which the other end is connected to the lower end of the support frame; and lower holding links of which one end is connected to the base part such that the lower holding link is in parallel with the upper holding link and of which the other end is connected to the lower end of the support frame.

14. The continuous unloader of claim 12, wherein the link mechanism includes a main link of which one end is connected to the base part and of which the other end is connected to the front sprockets, an assistant link of which one end is connected to the midpoint of the main link and of which the other end is connected to the lower sprockets side, a stay link of which one end is connected to the midpoint of the assistant link and of which the other end is connected to the base part.

* * * * *